United States Patent
Ooe et al.

(10) Patent No.: US 7,708,896 B2
(45) Date of Patent: May 4, 2010

(54) ION ELUTING UNIT AND DEVICE LOADED WITH SAME

(75) Inventors: Hirokazu Ooe, Yao (JP); Minoru Tadano, Sakai (JP); Mugihei Ikemizu, Osaka (JP); Hirofumi Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1213 days.

(21) Appl. No.: 10/535,494

(22) PCT Filed: Oct. 23, 2003

(86) PCT No.: PCT/JP03/13584

§ 371 (c)(1), (2), (4) Date: Nov. 7, 2005

(87) PCT Pub. No.: WO2004/046043

PCT Pub. Date: Jun. 3, 2004

(65) Prior Publication Data

US 2006/0151316 A1     Jul. 13, 2006

(30) Foreign Application Priority Data

Nov. 19, 2002    (JP) .............................. 2002-335630

(51) Int. Cl.
    *C02F 1/00*       (2006.01)
    *C02F 1/461*     (2006.01)
    *C25B 9/00*       (2006.01)
(52) U.S. Cl. ................ 210/748.18; 204/242; 204/278.5
(58) Field of Classification Search .................. 204/242, 204/278.5; 210/748
See application file for complete search history.

(56) References Cited

U.S. PATENT DOCUMENTS

| | | | | |
|---|---|---|---|---|
| 4,525,253 A | * | 6/1985 | Hayes et al. | 210/748 |
| 5,198,078 A | * | 3/1993 | Gale et al. | 205/404 |
| 7,413,637 B2 | * | 8/2008 | Scheper et al. | 204/275.1 |
| 2004/0108261 A1 | * | 6/2004 | King et al. | 210/198.1 |
| 2004/0144136 A1 | | 7/2004 | Mae et al. | |

FOREIGN PATENT DOCUMENTS

| | | |
|---|---|---|
| CA | 2242101 A1 | 1/2000 |
| CH | 662804 A1 | 10/1987 |

(Continued)

OTHER PUBLICATIONS

Machine Translation of JP 2001-276828.*
Machine Translation of JP 2002-263649.*
Office Action, Korean Utility Model Application No. 0341190, Aug. 31, 2004.
Letters Patent, Korean Utility Model Application No. 034199, Jan. 29, 2004.

*Primary Examiner*—Harry Wilkins
*Assistant Examiner*—Zulmariam Mendez
(74) *Attorney, Agent, or Firm*—Birch, Stewart, Kolasch & Birch, LLP

(57) ABSTRACT

An ion elution unit generates metal ions by applying a voltage between electrodes. Terminals are formed integrally to the electrodes. An interval between the electrodes becomes narrower from an upstream side to a downstream side with respect to a water current flowing through an inside of a casing of the ion elution unit. Terminals that are so laid as to run from the electrodes out of a casing of the ion elution unit are disposed on an upstream side with respect to a water current flowing through an inside of the casing.

14 Claims, 14 Drawing Sheets

FOREIGN PATENT DOCUMENTS

| | | |
|---|---|---|
| JP | 7-144090 A | 6/1995 |
| JP | 7-43356 U | 8/1995 |
| JP | 3033029 U | 10/1996 |
| JP | 2001-58189 A | 3/2001 |
| JP | 2001-62458 A | 3/2001 |
| JP | 2001-170392 A | 6/2001 |
| JP | 2001-276484 A | 10/2001 |
| JP | 2001-276828 A | 10/2001 |
| JP | 2001-279745 A | 10/2001 |
| JP | 2002-263649 A | 9/2002 |
| KR | 0161040 B1 | 8/1998 |
| KR | 2002-12368 | 2/2002 |
| WO | WO-97/19896 A1 | 6/1997 |
| WO | WO-02/081809 A1 | 10/2002 |

* cited by examiner

ION ELUTING UNIT AND DEVICE LOADED WITH SAME

BACKGROUND OF THE INVENTION

1. Field of the Invention

The present invention relates to an ion elution unit for eluting metal ions having an antimicrobial effect into water, and also relates to an appliance, in particular a washer, that uses water mixed with metal ions generated by such ion elution unit.

2. Description of the Related Art

When laundry is washed in a washer, it is common to add a treatment substance to water, in particular, to rinsing water. Typical examples of such treatment substances include softening and starching agents. In addition to these, in recent years, the demand has been increasing for treatment whereby laundry is subjected to antimicrobial treatment.

From the hygienic point of view, it is desirable to hang laundry in the sun to dry. However, in recent years, with the increase in the number of women who go to work, and with the increase in the number of nuclear families, there have been an increasing number of households where no one is at home in the daytime. In these households, there is no choice but to hang laundry indoors to dry. Even in households where someone is at home in the daytime, in a rainy weather, there is no choice but to hang laundry indoors to dry.

As compared with hanging laundry in the sun to dry, hanging it indoors tends to promote growth of bacteria and mold in laundry. This tendency is marked particularly when it takes time to dry laundry, as when humidity is high, such as in a rainy season, or when temperature is low. As the amount of bacteria and mold increases, laundry may become smelly. For this reason, in households where there is usually no choice but to hang laundry indoors to dry, there is a high demand for antimicrobial treatment of textile articles for the purpose of suppressing growth of bacteria and mold.

Nowadays, many clothes are available that have previously been treated with antimicrobial/deodorizing or antifungal treatment. However, it is difficult to replace all the textile articles in a household with those previously treated with antimicrobial/deodorizing treatment. Moreover, even with such textile articles, as they are washed repeatedly, the efficacy of antimicrobial/deodorizing treatment wears off.

Conceived under these circumstances was the idea of treating laundry with antimicrobial treatment every time it is washed. For example, Japanese Utility Model Laid-Open No. H5-74487 discloses an electric washer furnished with an ion generator that generates metal ions, such as silver ions or copper ions that exert a sterilizing effect. Japanese Patent Application Laid-Open No. 2000-93691 discloses a washer that generates an electric field with which to sterilize cleaning fluid. Japanese Patent Application Laid-Open No. 2001-276484 discloses a washer furnished with a silver ion adding unit that adds silver ions to cleaning water.

SUMMARY OF THE INVENTION

An object of the present invention is to provide an ion elution unit for generating metal ions having an antimicrobial effect in which metal ion generation efficiency is high. Another object of the present invention is to provide an appliance, in particular a washer, that uses water mixed with metal ions generated by such an ion elution unit to avoid adverse effects brought about growth of bacteria, and that permits the ion elution unit to operate efficiently.

To achieve the above object, according to the present invention, an ion elution unit is constructed in the following manner. In an ion elution unit generating metal ions by applying a voltage between electrodes, a space is secured between the electrodes and the inner surface of the casing of the ion elution unit. With this construction, the electrodes are supported with a space secured between them and the inner surface of the casing. This prevents a metal layer from growing from the electrodes to the inner surface of the casing and eventually causing short-circuiting between the electrodes themselves.

According to the present invention, in the ion elution unit constructed as described above, the interval between the electrodes is so set as to become narrower from the upstream side to the downstream side with respect to the water current flowing through the inside of the casing of the ion elution unit. With this construction, the interval between the electrodes is so tapered as to become increasingly narrow from the upstream to the downstream side. This permits the electrodes to lie along the water current, and thus, even when they wear and become thin, they are not prone to chatter or chip. Moreover, the electrodes are unlikely to be so heavily deformed as to cause short-circuiting therebetween.

According to the present invention, in the ion elution unit constructed as described above, terminals that are so laid as to run from the electrodes out of the casing of the ion elution unit are disposed on the upstream side with respect to the water current flowing through the inside of the casing, and a supporting portion for supporting the downstream-side parts of the electrodes is formed on the inner surface of the casing. With this construction, the electrodes are supported firmly both on the upstream and downstream sides, and thus do not vibrate in the water current. This makes the electrodes unlikely to break as a result of vibration.

According to the present invention, in the ion elution unit constructed as described above, a water inflow port and a water outflow port are formed in the casing of the ion elution unit, and the outflow port is given a smaller cross-sectional area than the inflow port. With this construction, the outflow port of the ion elution unit has a smaller cross-sectional area, and hence a higher flow passage resistance, than the inflow port thereof. Thus, the water that has entered the casing through the inflow port fills the interior of the casing without leaving a lump of stagnant air, and thus completely immerses the electrodes. This permits no part of the electrodes to be left uninvolved in the generation of metal ions and remain uneluted.

According to the present invention, in the ion elution unit constructed as described above, the cross-sectional area of the interior space of the casing gradually decreases from the upstream side to the downstream side. With this construction, not only is the cross-sectional area of the outflow port smaller than that of the inflow port, the cross-sectional area of the interior space of the casing gradually decreases from the upstream to the downstream side. This makes turbulent currents or air bubbles unlikely to form inside the casing, and thus ensures a smooth water current. The electrodes are less likely to remain uneluted under the cover of air bubbles. Metal ions quickly leave the electrodes, and do not return thereto, resulting in enhanced ion elution efficiency.

According to the present invention, in the ion elution unit constructed as described above, a water inflow port and a water outflow port are formed in the casing of the ion elution unit, and the water outflow port is located in the lowest position within the interior space of the casing. With this construction, since the outflow port is located in the lowest position within the interior space of the casing, when the supply of water to the ion elution unit is stopped, all the water inside it flows out of it through the outflow port. This prevents water remaining inside the casing from being frozen in cold weather and causing failure or destruction of the ion elution unit.

According to the present invention, in the ion elution unit constructed as described above, terminals that are so laid as to run from the electrodes out of the casing of the ion elution unit are formed in a position inward of the ends of the electrodes located on the upstream side with respect to the water current flowing through the inside of the casing. With this construction, the terminals are indeed upstream-side parts of the electrode but are not at the very ends thereof; that is, they are formed inward of the upstream-side ends of the electrode. This prevents the wear that has started at the ends of the electrodes from reaching the terminals and making them break at the bases thereof.

According to the present invention, in the ion elution unit constructed as described above, the terminals that are so laid as to run out of the casing of the ion elution unit are formed integrally with the electrodes. With this construction, since the electrodes and the terminals are formed integrally, as opposed to when separate metal components are joined together, no potential difference appears between the electrodes and the terminals, and thus no corrosion occurs there. Moreover, integrally forming these helps simplify the manufacturing process.

According to the present invention, in the ion elution unit constructed as described above, the terminals that are so laid as to run from the electrodes out of the casing of the ion elution unit have parts thereof located inside the casing protected with a sleeve made of an insulating material. With this construction, the parts of the terminals located inside the casing are protected with a sleeve made of an insulating material, and thus do not wear as a result of energization. This prevents the terminals from breaking in the middle of use.

According to the present invention, in the ion elution unit constructed as described above, the terminals laid from the electrodes are so formed as to penetrate the bottom wall of the case of the ion elution unit and protrude downward. With this construction, even when condensation occurs on the outer surface of the casing as a result of water vapor making contact with the casing or the casing being cooled as water is passed therethrough, the condensed water flows down along the cable connected to the terminals, and thus does not collect at the boundaries between the terminals and the casing. This prevents the terminals from being short-circuited by condensed water.

According to the present invention, in an ion elution unit as described above, an anode electrode is made of silver, copper, zinc or an alloy of silver and copper. With this construction, silver ions eluted from a silver electrode, copper ions eluted from a copper electrode and zinc ions eluted from a zinc electrode are exploited their excellent sterilizing effect, even on mold.

According to the present invention, in an ion elution unit as described above, both anode electrode and cathode electrode are made of silver, copper, zinc or an alloy of silver and copper. With this construction, silver ions eluted from a silver electrode, copper ions eluted from a copper electrode and zinc ions eluted from a zinc electrode are exploited their excellent sterilizing effect, even on mold. This effect is unchanged when the polarity of the electrodes is reversed.

According to the present invention, in an ion elution unit as described above, the polarity of the electrodes is reversed cyclically. With this construction, a problem that the surface of electrode is covered with a thick layer of scale deposited through the use of long period and current is subjected to be restricted, is avoidable. Also a problem of "one-sided depletion," in which only one electrode being used as an anode is consumed at a rate faster than the other, is avoidable.

According to the present invention, an ion elution unit as described above is incorporated in an appliance so that the appliance uses water mixed with metal ions generated by the ion elution unit. With this construction, it is possible to use water mixed with metal ions generated by the ion elution unit. For example, if the appliance is a dish washing machine, it is possible to treat eating utensils with antimicrobial treatment using metal ions and thereby enhance hygiene. If the appliance is a humidifier, it is possible to prevent proliferation of bacteria and algae in the water stored in its water tank and thereby prevent bacteria and algae spores from being spread into the air and causing an infection or allergy in a person who inhaled them.

According to the present invention, in the appliance constructed as described above, the appliance is a washer. With this construction, it is possible to treat with antimicrobial treatment using metal ions and thereby prevent proliferation of bacteria and mold and generation of an offensive smell.

DETAILED DESCRIPTION OF THE INVENTION

An embodiment of the present invention will be described with reference to Figures.

Figure 1:
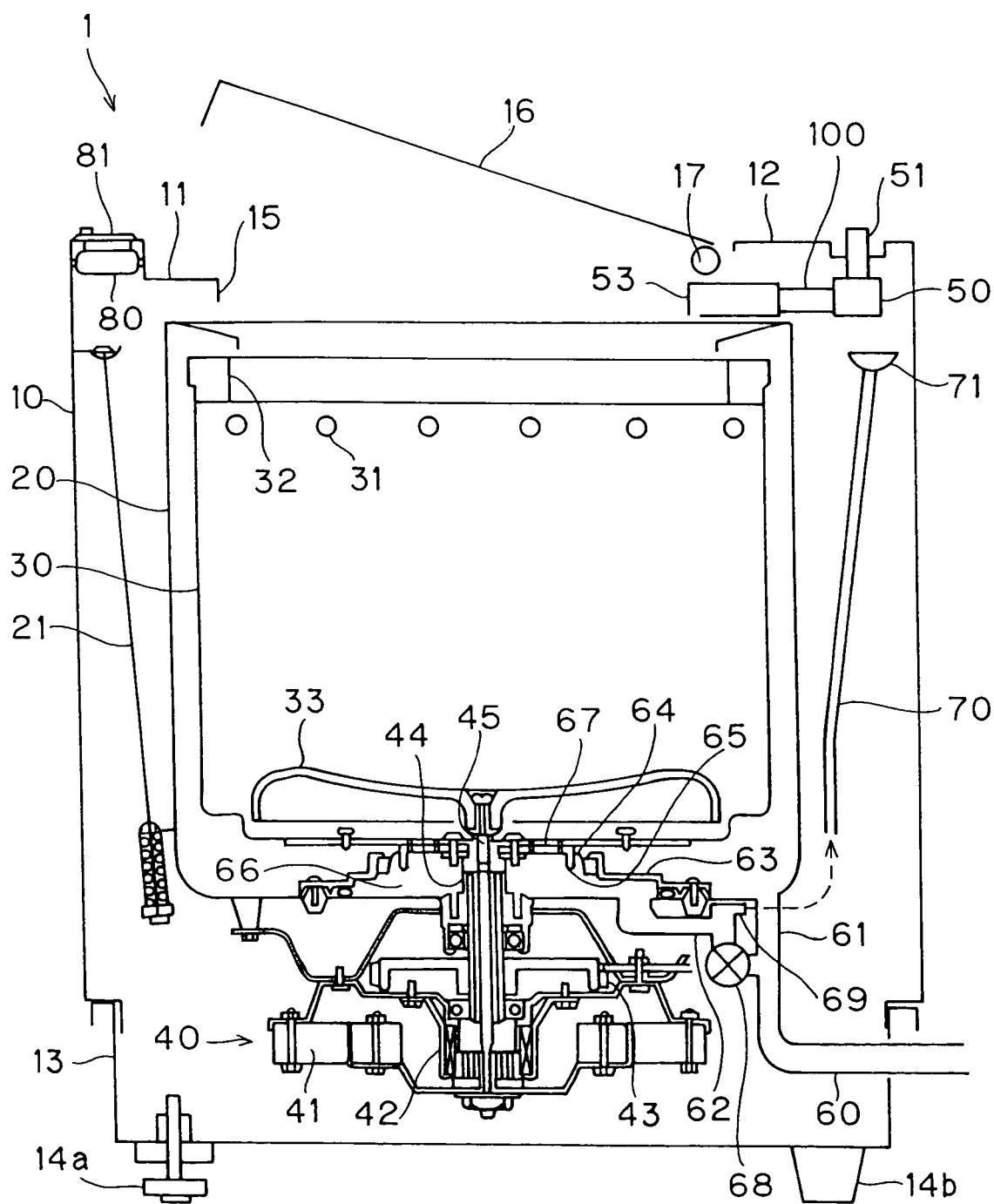
FIG. 1 is a vertical sectional view of a washer embodying the present invention.

FIG. 1 is a vertical sectional view showing the overall construction of a washer 1. The washer 1 is of an automatic type, and has a cabinet 10. The box-shaped cabinet 10 is formed of metal or synthetic resin, and has openings at its top and bottom. The top opening of the cabinet 10 is covered with a top plate 11, which is formed of synthetic resin and is fixed to the cabinet 10 with screws. In FIG. 1, front and rear of the washer 1 point leftward and rightward, respectively. A rear portion of a top surface of the top plate 11 is covered with a back panel 12, which is formed of synthetic resin and is fixed to the cabinet 10 or the top plate 11 with screws. The bottom opening of the cabinet 10 is covered with a base 13, which is formed of synthetic resin and is fixed to the cabinet 10 with screws. None of the screws mentioned thus far are shown in the figure.

Feet 14a and 14b for supporting the cabinet 10 on a floor are disposed at the four corners of the base 13. The rear feet 14b are fixed feet integrally formed with the base 13. The front feet 14a are height-adjustable screw feet, and turning them levels the washer 1.

The top plate 11 has a laundry inlet opening 15 through which laundry is put in a washing tub described later. The laundry inlet opening 15 is covered with a lid 16 from above. The lid 16 is coupled to the top plate 11 with a hinge 17 so as to be pivotable in a vertical plane.

A water tub 20 and a washing tub 30 that serves also as a squeezing tub are disposed inside the cabinet 10. Both the water tub 20 and the washing tub 30 are shaped in a cylindrical cup open at its top, and the two tubs are arranged concentrically with their axes vertical and with the washing tub 30 placed inside the water tub 20. The water tub 20 is suspended from the cabinet 10 with suspension members 21. The suspension members 21 connect a lower outer surface of the water tub 20 to four inner corners of the cabinet 10, and support the water tub 20 in such a way that it can swing in a horizontal plane.

The washing tub 30 has a circumferential wall that widens upward with a gentle taper. This circumferential wall has a plurality of drain holes 31 formed in a ring-shaped arrangement around its topmost portion, and has, other than these drain holes, no opening that permits passage of liquid. The washing tub 30 is of so-called "holeless" type. A ring-shaped balancer 32 is attached to a rim of the top opening of the washing tub 30 to suppress vibration produced by the washing tub 30 when it rotates at high speed for squeezing of laundry. Inside the washing tub 30, on its bottom surface, a pulsator 33 is disposed to produce a current of washing or rinsing water inside the tub 30.

The water tub 20 has a drive unit 40 fitted to its bottom surface from below. The drive unit 40 includes a motor 41, a clutch mechanism 42, and a brake mechanism 43, and has a squeezing spindle 44 and a pulsator spindle 45 protruding from its center upward. The squeezing spindle 44 and the pulsator spindle 45 form a double-spindle structure, with the pulsator spindle 45 placed inside the squeezing spindle 44. The two spindles both penetrate the water tub 20. The squeezing spindle 44 is then connected to the washing tub 30 so as to support it. On the other hand, the pulsator spindle 45 further penetrates the washing tub 30, and is then connected to the pulsator 33 to support it. Sealing members for preventing leakage of water are disposed between the squeezing spindle 44 and the water tub 20 and between the squeezing spindle 44 and the pulsator spindle 45.

A water feed valve 50, which is operated electro-magnetically, is disposed inside a space below the back panel 12. The water feed valve 50 has a connection pipe 51 that penetrates the back panel 12 to extend upward. A water feed hose (not shown) through which to supply clean water such as tap water to the washer is connected to the connection pipe 51. The water feed valve 50 feeds water to a water feed mouth 53 in a shape of container that is placed above the inside of the water tub 20. The water feed mouth 53 has a structure as shown in FIG. 2.

Figure 2:
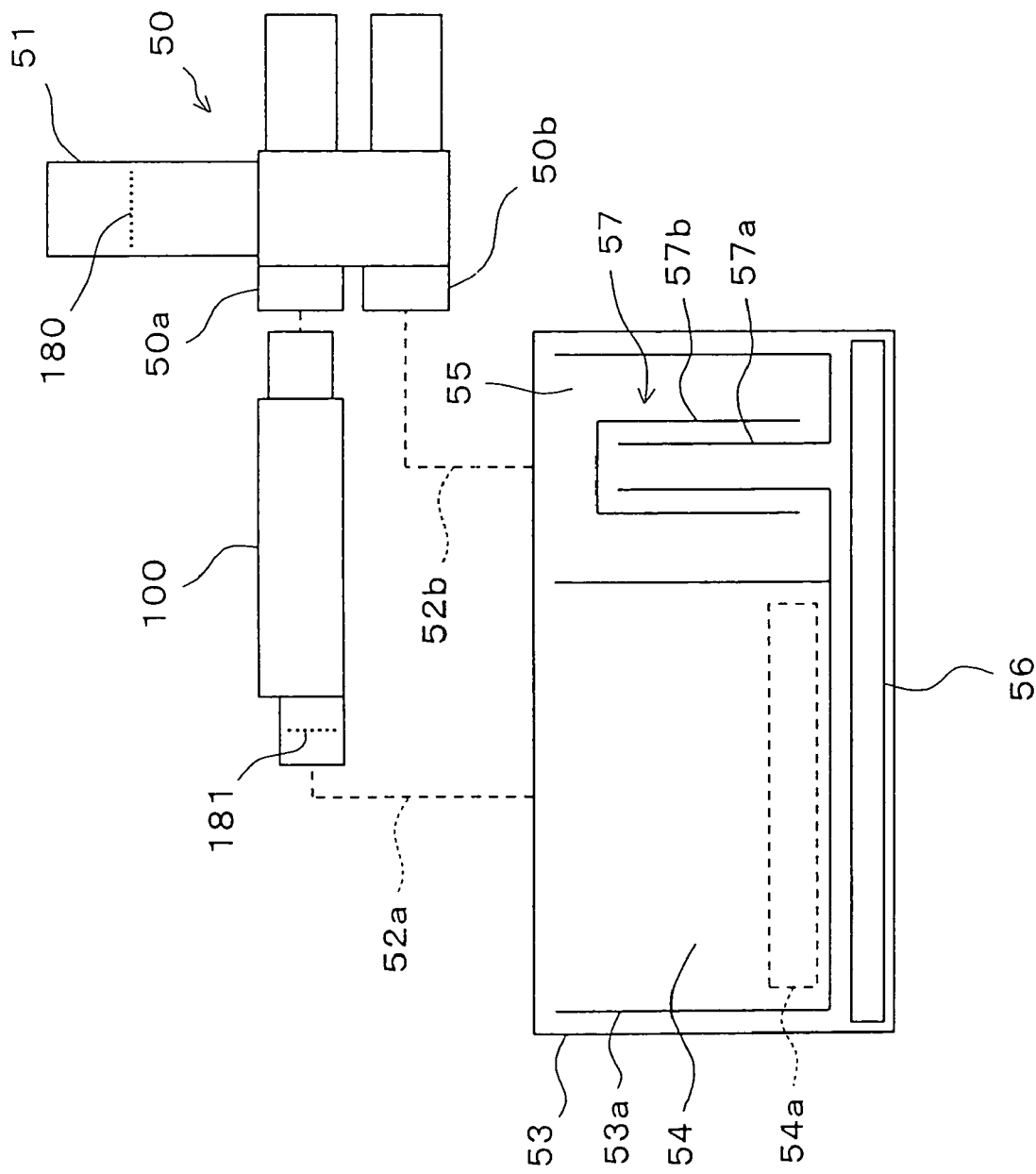
FIG. 2 is a schematic vertical sectional view of a water feed mouth.

FIG. 2 is a schematic vertical sectional view of the water feed mouth 53. The water feed mouth 53 has an opening in its front, and through the opening, a drawer 53a is inserted. The drawer 53a has its interior divided into a plurality of sections (the embodiment of the present has two sections, that is, a left-hand section and a right-hand section). The left-hand section is a detergent chamber 54 that serves as a storage space for detergent. The right-hand section is a treatment agent chamber 55 that serves as a storage space for treatment agent for laundry washing. A bottom of the detergent chamber 54 is provided with a water outlet 54a which is open toward an inside of the water feed mouth 53. A siphon 57 is disposed in the treatment agent chamber 55. The water feed mouth 53 has, below the bottom of the drawer 53a, a water outlet 56 through which water is fed into the washing tub 30.

The siphon 57 is composed of an inner pipe 57a that extends vertically upward from a bottom surface of the treatment agent chamber 55 and a cap-shaped outer pipe 57b with which the inner pipe 57a is capped. Between the inner pipe 57a and the outer pipe 57b is left a gap that permits passage of water. The inner pipe 57a, at its bottom, is open to a bottom of the water feed mouth 53. A predetermined gap is kept between a bottom end of the outer pipe 57b and a bottom surface of the treatment agent chamber 55 so as to serve as a water inlet. When water is poured into the treatment agent chamber 55 up to a level higher than a top end of the inner pipe 57a, a principle of siphon works to cause water to flow through the siphon 57 out of the treatment agent chamber 55 and then drop to the bottom of the water feed mouth 53, water is then poured into the washing tub 30 through the water outlet 56.

The water feed valve 50 is composed of a main water feed valve 50a and a sub water feed valve 50b. The main water feed valve 50a allows relatively large flow of water, while the sub water feed valve 50b allows relatively small flow of water. Setting the flow of water large or small is achieved by making the internal structure of the main water feed valve 50a and that of the sub water feed valve 50b be different from each other, or by making the internal structures of both valves same and combining them with flow-limiting members having different throttling ratio. The connection pipe 51 is shared between the main and sub water feed valves 50a and 50b.

The main water feed valve 50a is connected to an opening in a ceiling of the water feed mouth 53 by way of a main water feed passage 52a. This opening is open toward the detergent chamber 54, so that a large amount of water flow from the main water feed valve 50a is poured into the detergent chamber 54 through the main water feed passage 52a. The sub water feed valve 50b is connected to the opening in the ceiling of the water feed mouth 53 by way of a sub water feed passage 52b. This opening is open toward the treatment agent chamber 55, so that a small amount of water flow from the sub water feed valve 50b is poured into the treatment agent chamber 55 through the sub water feed passage 52b. That is, a passage that runs from the main water feed valve 50a through the detergent chamber 54 to the washing tub 30 is separate from a passage that runs from the sub water feed valve 50b through the treatment agent chamber 55 to the washing tub 30.

Back in FIG. 1, to the bottom of the water tub 20 is fitted a drain hose 60 through which water is drained out of the water tub 20 and the washing tub 30. Water flows into the drain hose 60 from drain pipes 61 and 62. The drain pipe 61 is connected to a rather peripheral portion of the bottom surface of the water tub 20, and the drain pipe 62 is connected to a rather central portion of the bottom surface of the water tub 20.

Inside the water tub 20, on its bottom surface, there is fixed a ring-shaped partition wall 63 in such a way as to enclose the portion of the water tub 20 where the drain pipe 62 is connected to it. The partition wall 63 is fitted with a circular sealing member 64 at its top. The sealing member 64 is kept in contact with a circumferential surface of a disk fixed to an outer bottom surface of the washing tub 30 so as to form a separate drain space 66 between the water tub 20 and the washing tub 30. The drain space 66 communicates with an interior of the washing tub 30 through a drain outlet 67 formed in the bottom of the washing tub 30.

The drain pipe 62 is provided with a drain valve 68 that is operated electro-magnetically. In a portion of the drain pipe 62, on the upstream side of the drain valve 68, an air trap 69 is disposed. A lead pipe 70 extends from the air trap 69. The lead pipe 70 is, at its top end, connected to a water level switch 71.

A controller 80 is disposed in a front portion of the cabinet 10, beneath the top plate 11. The controller 80 receives instructions from users via an operation/display panel 81 disposed on the top surface of the top plate 11, and sends operation commands to the drive unit 40, the water feed valve 50, and the drain valve 68. The controller 80 also sends display commands to the operation/display panel 81. The controller 80 includes a drive circuit for driving an ion elution unit described later.

How the washer 1 operates will now be described. First, the lid 16 is opened, and laundry is put into the washing tub 30 through the laundry inlet opening 15. The drawer 53a is pulled out from the water feed mouth 53 and a detergent is put in the detergent chamber 54 in the drawer 53a. A treatment agent (softening agent) is put in the treatment agent chamber 55. The treatment agent (softening agent) can be put there in the middle of a laundry washing session, or may not be put when unnecessary. After the detergent and the treatment agent (softening agent) are set, the drawer 53a is pushed back into the water feed mouth 53.

After the detergent and the treatment agent (softening agent) are made ready for addition in this way, the lid 16 is closed, and a desired course of laundry washing is selected by operating a group of operation buttons on the operation/display panel 81. By pressing a start button subsequently, a session of laundry washing is executed according to the flow charts shown in FIGS. 10 through 13.

Figure 10:
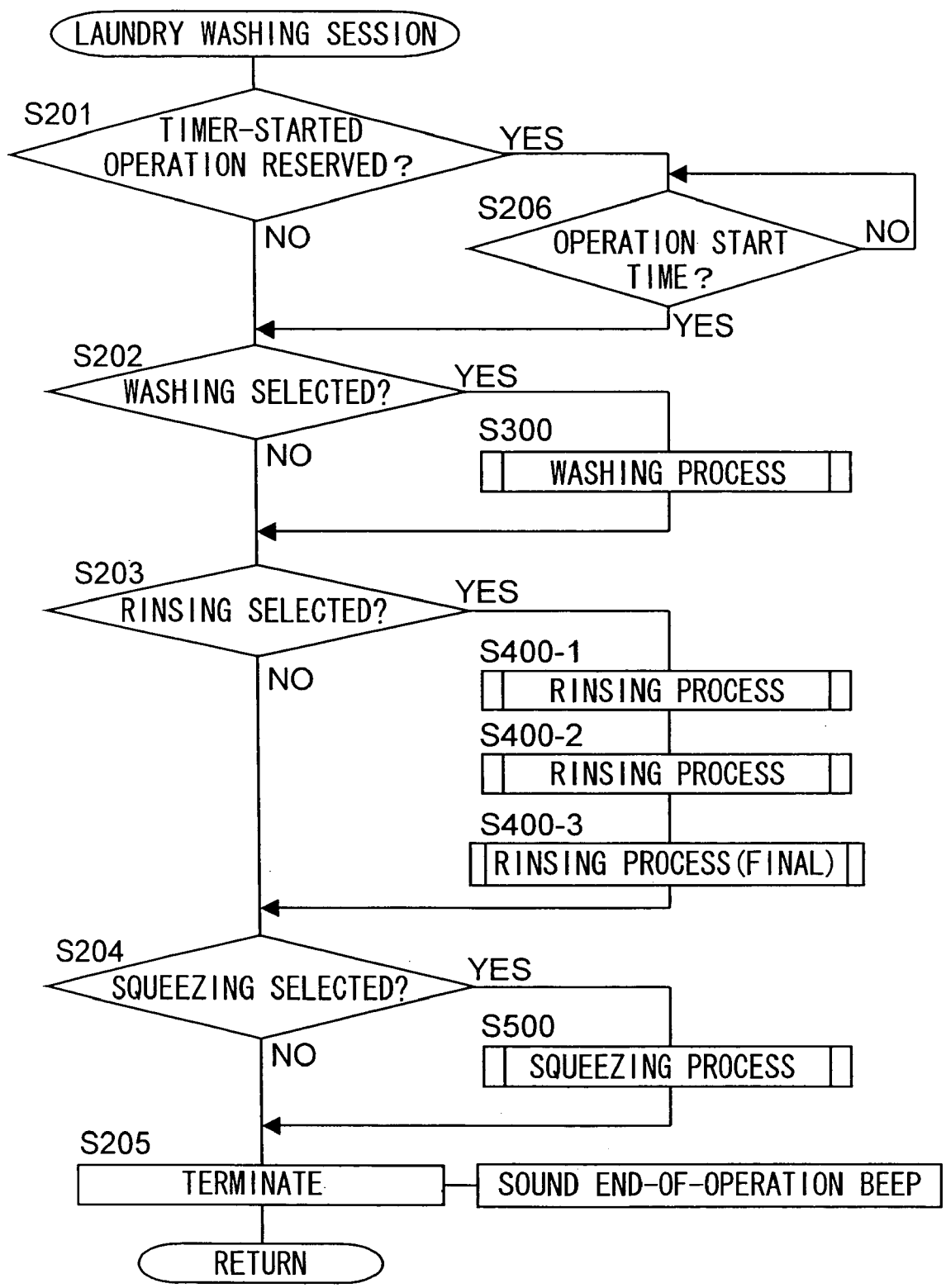
FIG. 10 is a flow chart of an entire session of laundry washing.

FIG. 10 is a flow chart showing the entire session of laundry washing. In step S201, laundry washing is started at a previously set time. Whether a timer-started operation is selected or not is checked. If a timer-started operation is selected, the flow proceeds to step S206; if not, the flow proceeds to step S202.

In step S206, whether the operation start time has come or not is checked. If the operation start time has come, the flow proceeds to step S202.

In step S202, whether a washing process is selected or not is checked. If a washing process is selected, the flow proceeds to S300. How the washing process in step S300 is executed will be described later with reference to the flow chart shown in FIG. 11. On completion of the washing process, the flow proceeds to step S203. If no washing process is selected, the flow proceeds directly from step S202 to step S203.

In step S203, whether a rinsing process is selected or not is checked. If a rinsing process is selected, the flow proceeds to S400. How the rinsing process in step S400 is executed will be described later with reference to the flow chart shown in FIG. 12. In FIG. 10, the rinsing process is repeated three times, and each step of the process is shown with a step number with a suffix number added such as "S400-1," "S400-2" and "S400-3." The number of times of the rinsing process is set at users' discretion. In this case, "S400-3" is a final rinsing process.

On completion of the rinsing process, the flow proceeds to step S204. If no rinsing process is selected, the flow proceeds directly from step S203 to step S204.

In step S204, whether a squeezing process is selected or not is checked. If a squeezing process is selected, the flow proceeds to S500. How the squeezing process in step S500 is executed will be described later with reference to the flow chart shown in FIG. 13. On completion of the squeezing process, the flow proceeds to step S205. If no squeezing process is selected, the flow proceeds directly from step S204 to step S205.

In step S205, termination of operation of the controller 80, in particular a processing unit (microcomputer) therein, is automatically executed in accordance with a predetermined procedure. In addition, the completion of laundry washing session is indicated by sounding an operation-completion beep. On completion of all the operations, the washer 1 goes back into a stand-by state in preparation for a new session of laundry washing.

Next, with reference to FIGS. 11 through 13, the individual processes of washing, rinsing, and squeezing will be described.

Figure 11:
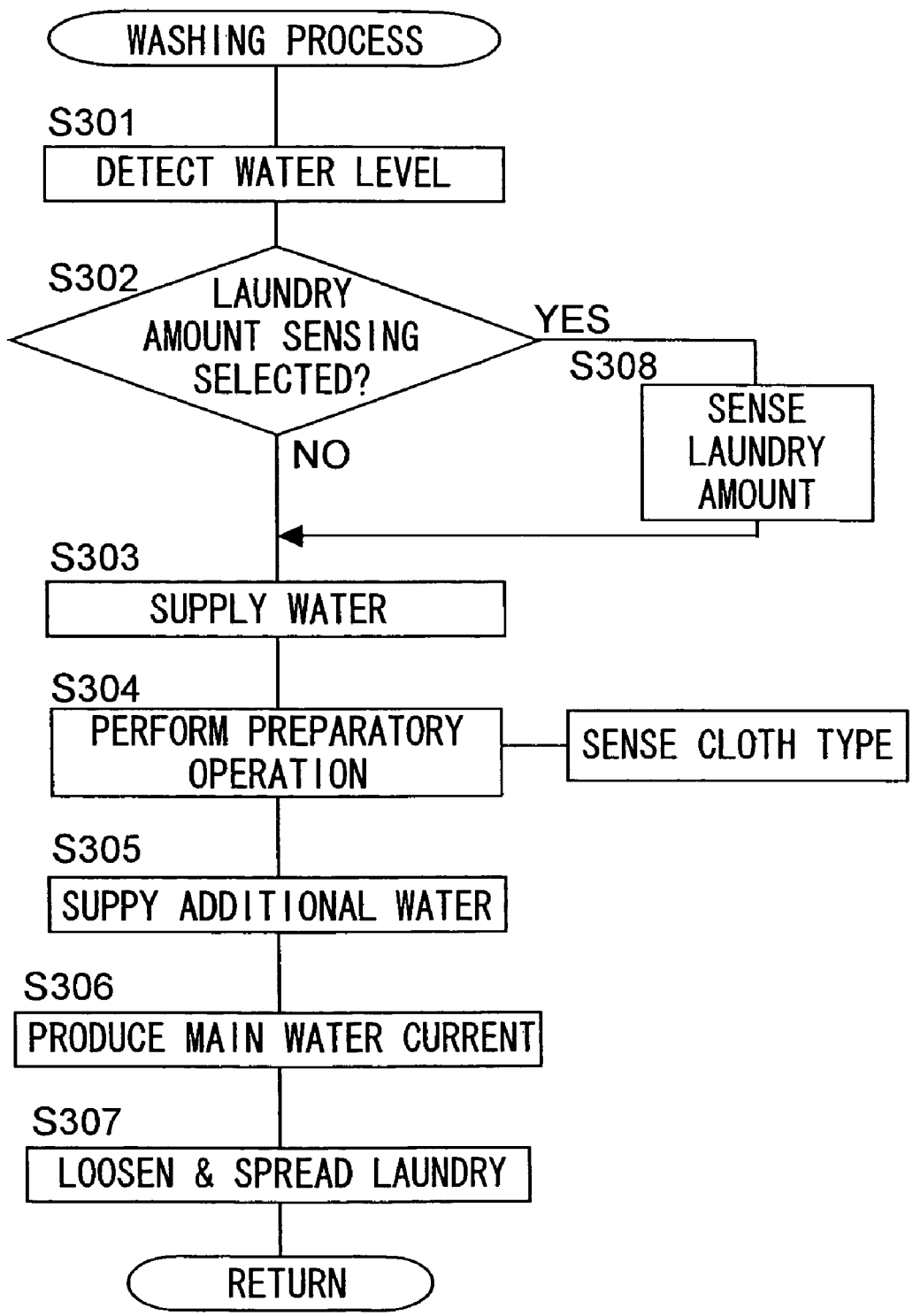
FIG. 11 is a flow chart of a washing process.
Figure 12:
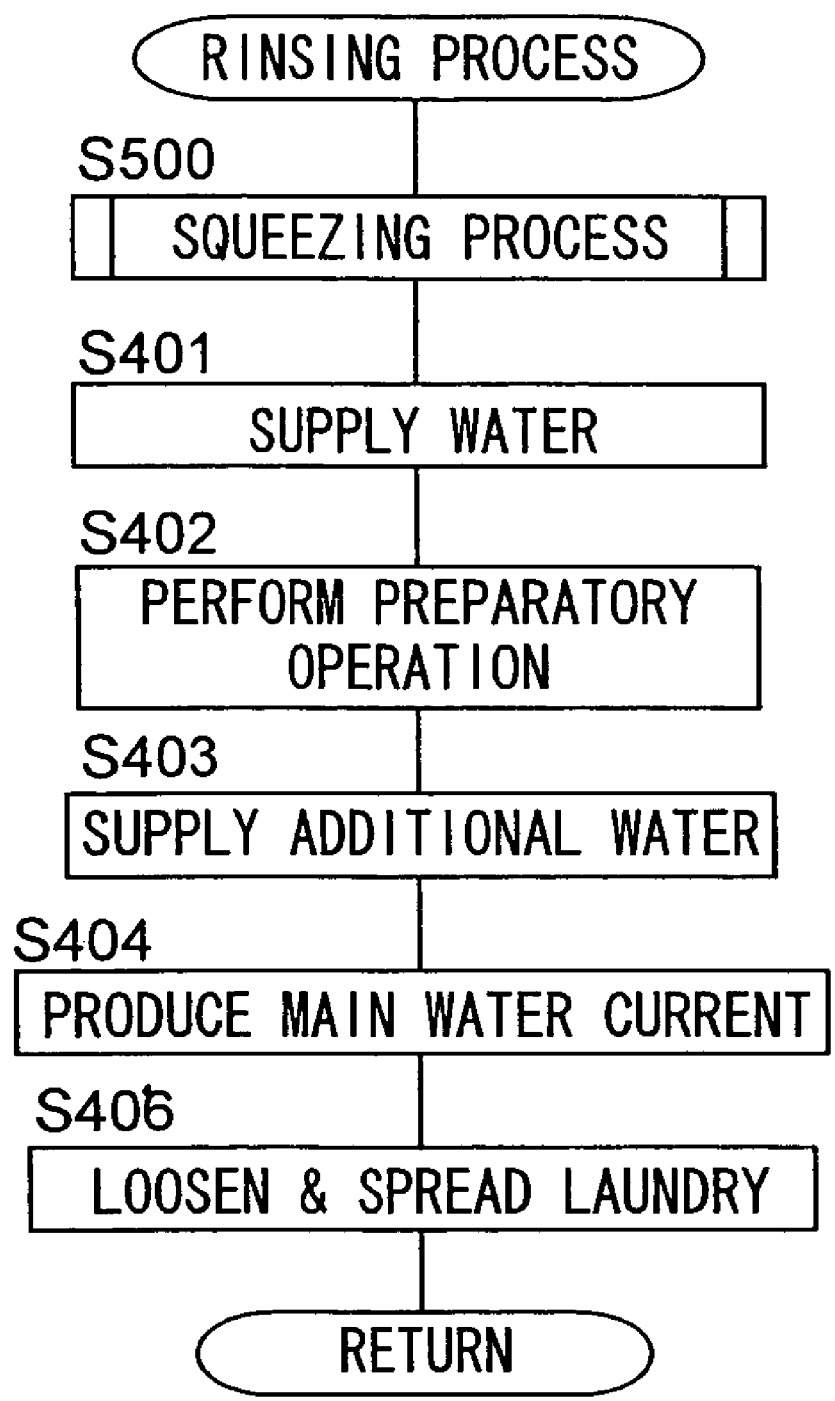
FIG. 12 is a flow chart of a rinsing process.

FIG. 11 is a flow chart of the washing process. In step S301, the water level inside the washing tub 30 as sensed by the water level switch 71 starts being monitored. In step S302, whether laundry amount sensing is selected or not is checked. If laundry amount sensing is selected, the flow proceeds to step S308; if not, the flow proceeds directly from step S302 to S303.

In step S308, the amount of laundry is measured on the basis of load of rotation of the pulsator 33. On completion of laundry amount sensing, the flow proceeds to step S303.

In step S303, the main water feed valve 50a is opened, and water is poured into the washing tub 30 through the water feed mouth 53. The detergent agent put into the detergent chamber 54 is mixed with water, and enters the washing tub 30. The drain valve 68 remains closed. When the water level switch 71 detects the set water level, the main water feed valve 50a is closed. The flow then proceeds to step S304.

In step S304, a preparatory operation is performed. The pulsator 33 is rotated repeatedly in forward and then reverse directions to agitate the laundry and water so that the laundry is fully dipped in water. This permits the laundry to absorb an ample amount of water, and permits air trapped in many parts of the laundry to escape. If, as a result of the preparatory operation, the water level as detected by the water level switch 71 becomes lower than at the beginning, then, in step S305, the main water feed valve 50a is opened to supply additional water to recover the set water level.

If a course of laundry washing including "cloth type sensing" is selected, when the preparatory operation is performed, the type of cloth is sensed. On completion of the preparatory operation, the change of the water level from the set water level is detected, and, if the drop in the water level is greater than a predetermined amount, the laundry is judged to be of the highly water-absorbent cloth type.

When, in step S305, the set water level is stably obtained, the flow proceeds to step S306. According to the settings made by users, the motor 41 rotates the pulsator 33 in a predetermined pattern so as to produce, in the washing tub 30, a main current of water for washing. With this main current of water, the laundry is washed. The squeezing spindle 44 remains braked by the brake mechanism 43 so that, even when the washing water and the laundry move, the washing tub 30 does not rotate.

On completion of the period in which the laundry is washed with the main current of water, the flow proceeds to step S307. In step S307, the pulsator 33 is rotated repeatedly in the forward and then reverse directions at short time intervals. This permits the laundry to loosen, and thereby permits it to spread evenly in the washing tub 30. This is done in preparation for squeezing rotation of the washing tub 30.

Next, with reference to the flow chart shown in FIG. 12, the rinsing process will be described. First, in step S500, the squeezing process is executed, of which a description will be given later with reference to the flow chart shown in FIG. 13. On completion of squeezing, the flow proceeds to step S401. In step S401, the main water feed valve 50a is opened, and water is supplied up to the set water level.

On completion of the supply of water, the flow proceeds to step S402. In step S402, a preparatory operation is performed. During the preparatory operation performed in step S402, laundry getting attached to the washing tub 30 in step S500 (squeezing process) is separated, soaked into water so that the laundry thoroughly absorbs water.

On completion of the preparatory operation, the flow proceeds to step S403. If, as a result of the preparatory operation, the water level as detected by the water level switch 71 becomes lower than at the beginning, the main water feed valve 50a is opened to supply additional water to recover the set water level.

After recovering the set water level in step S403, the flow then proceeds to step S404. According to the settings made by users, the motor 41 rotates the pulsator 33 in a predetermined pattern so as to produce, in the washing tub 30, a main current of water for rinsing. With this main current of water, the laundry is rinsed. The squeezing spindle 44 remains braked by the brake mechanism 43 so that, even when the rinsing water and the laundry move, the washing tub 30 does not rotate.

On completion of the period in which the laundry is rinsed with the main current of water, the flow proceeds to step S406. In step S406, the pulsator 33 is rotated repeatedly in the forward and then reverse directions at short time intervals. This permits the laundry to loosen, and thereby permits it to spread evenly in the washing tub 30. This is done in preparation for squeezing rotation.

In the above description, rinsing is assumed to be performed with rinsing water stored in the washing tub 30. This is called "rinsing with stored water." It is, however, also possible to perform rinsing with always replenishing fresh water, which is called "rinsing with pouring water," or to perform rinsing with water kept supplied from the water feed mouth 53 while the washing tub 30 is rotated at a low speed, which is called "shower rinsing."

In the final rinsing process, different sequence from the above is executed. This will be described in details later.

Next, with reference to the flow chart shown in FIG. 13, the squeezing process will be described. First, in step S501, the drain valve 68 is opened. The washing water in the washing tub 30 is drained through the drain space 66. The drain valve 68 remains open during the squeezing process.

When most of the washing water has exited from the laundry, the clutch mechanism 42 and the brake mechanism 43 are switched over. The timing for switching over of the clutch mechanism 42 and the brake mechanism 43 is either before or at the same time of starting of draining of water. The motor 41 now rotates the squeezing spindle 44. This causes the washing tub 30 to start squeezing rotation. The pulsator 33 rotates together with the washing tub 30.

When the washing tub 30 rotates at a high speed, the laundry is pressed against the inner circumferential wall of the washing tub 30 by the centrifugal force. The washing water present in the laundry also gathers on the inner surface of the circumferential wall of the washing tub 30, and, since the washing tub 30 widens upward in a tapered shape as described earlier, the washing water driven by the centrifugal force rises along the inner surface of the washing tub 30. When the washing water reaches the top end of the washing tub 30, it is drained through the drain holes 31. The washing water that has exited from the drain holes 31 hits the inner surface of the water tub 20, and then flows down along the inner surface of the water tub 20 to the bottom of the water tub 20. The washing water is then drained out of the cabinet 10 through the drain pipe 61 and then through the drain hose 60.

Figure 13:
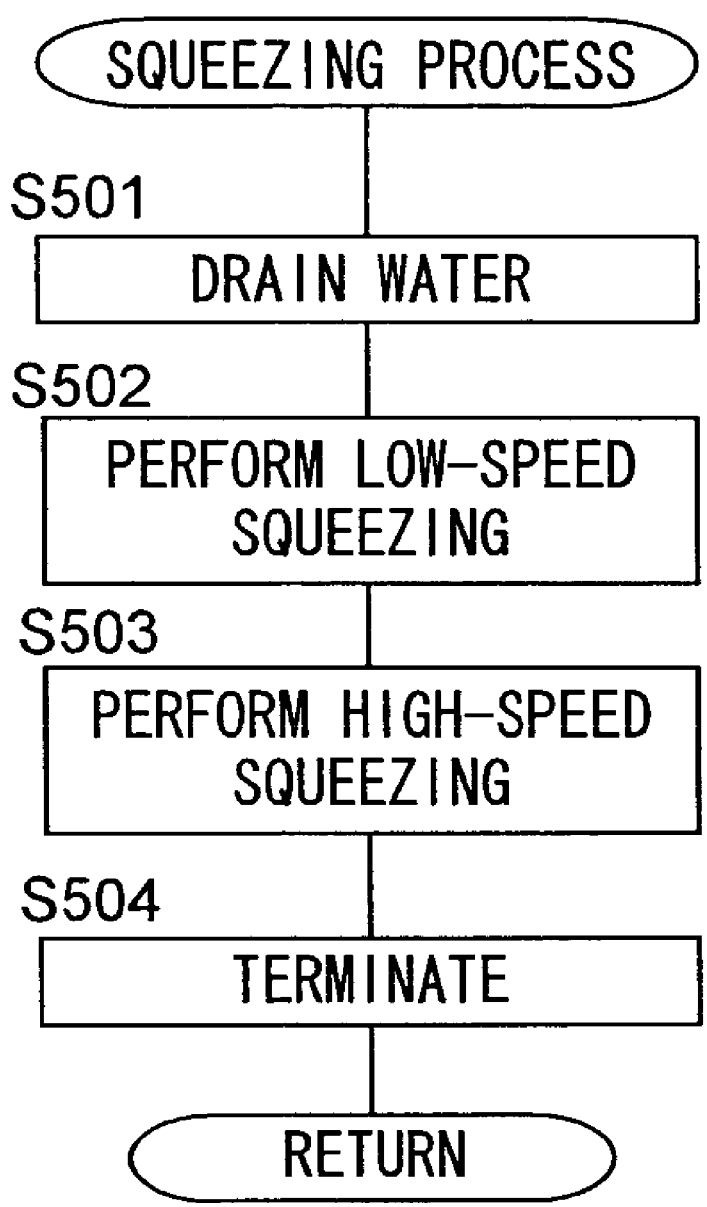
FIG. 13 is a flow chart of a squeezing process.

In the flow shown in FIG. 13, after squeezing is performed at a relatively low speed in step S502, squeezing is performed at high speed in step S503. On completion of step S503, the flow proceeds to step S504. In step S504, the supply of electric power to the motor 41 is stopped and termination operation is done for stopping.

The washer 1 is furnished with an ion elution unit 100. The ion elution unit 100 is connected to the downstream side of the main water feed pipe 52a. Now, with reference to FIGS. 3 through 9, the structure and functions of the ion elution unit 100 and the purpose for which it is incorporated in the washer 1 will be described.

Figure 3:
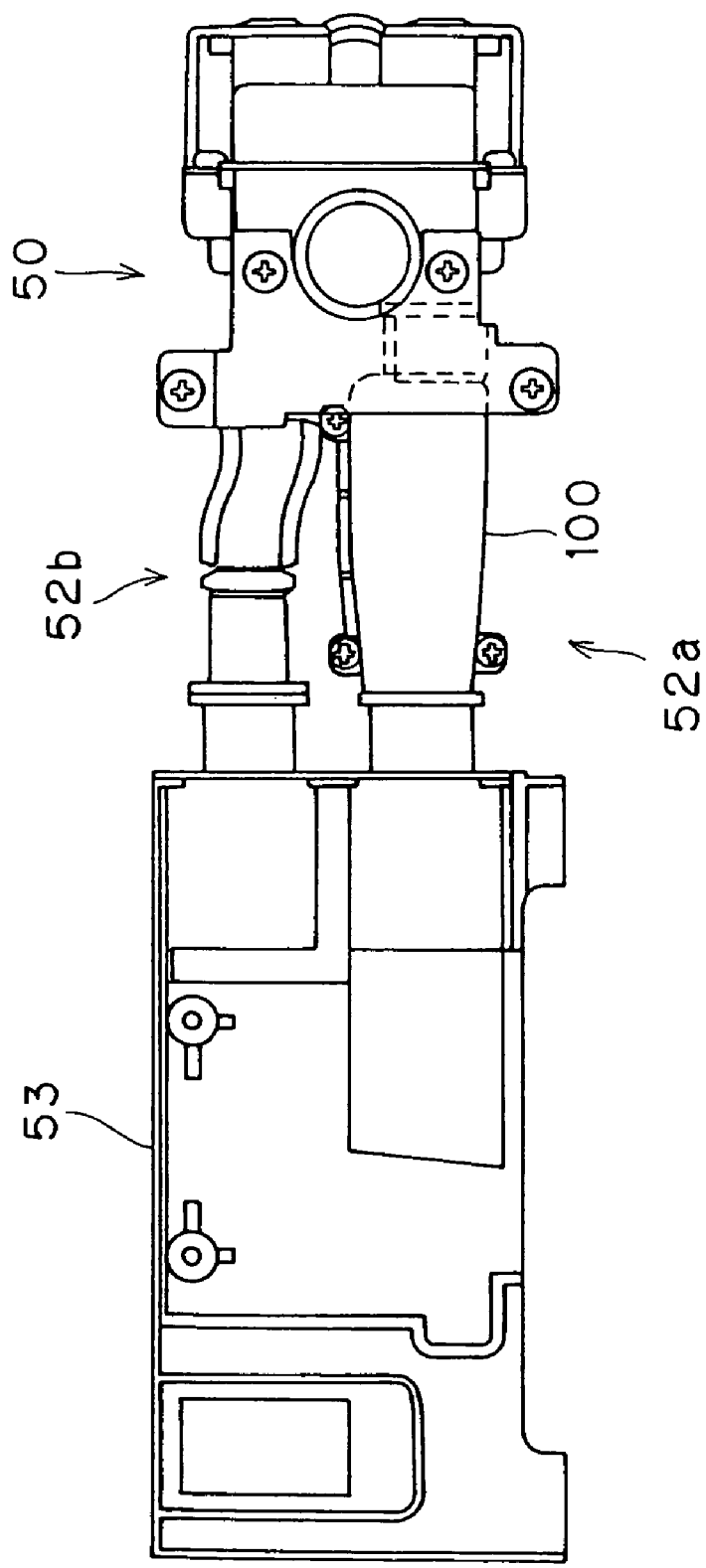
FIG. 3 is a partial top view of an interior of the washer.

FIG. 3 is a partial top view indicating the layout of the ion elution unit 100 and the water feed mouth 53. The ion elution unit 100 is connected directly to the main water feed valve 50a and the water feed mouth 53 on both ends. In other words, the ion elution unit 100 independently composes the entire main water feed passage 52a. The sub water feed passage 52b is constructed by connecting the pipe, which protrudes from the water feed mouth 53, to the sub water feed valve 50b with a hose. In the schematic view of FIG. 1, the water feed valve 50, the ion elution unit 100 and the water feed mouth 53 are arranged in line with front-to-rear axis of the washer 1. However, in an actual washer, they are not arranged in that way but arranged in line with left-to-right axis of the washer 1.

Figure 4:
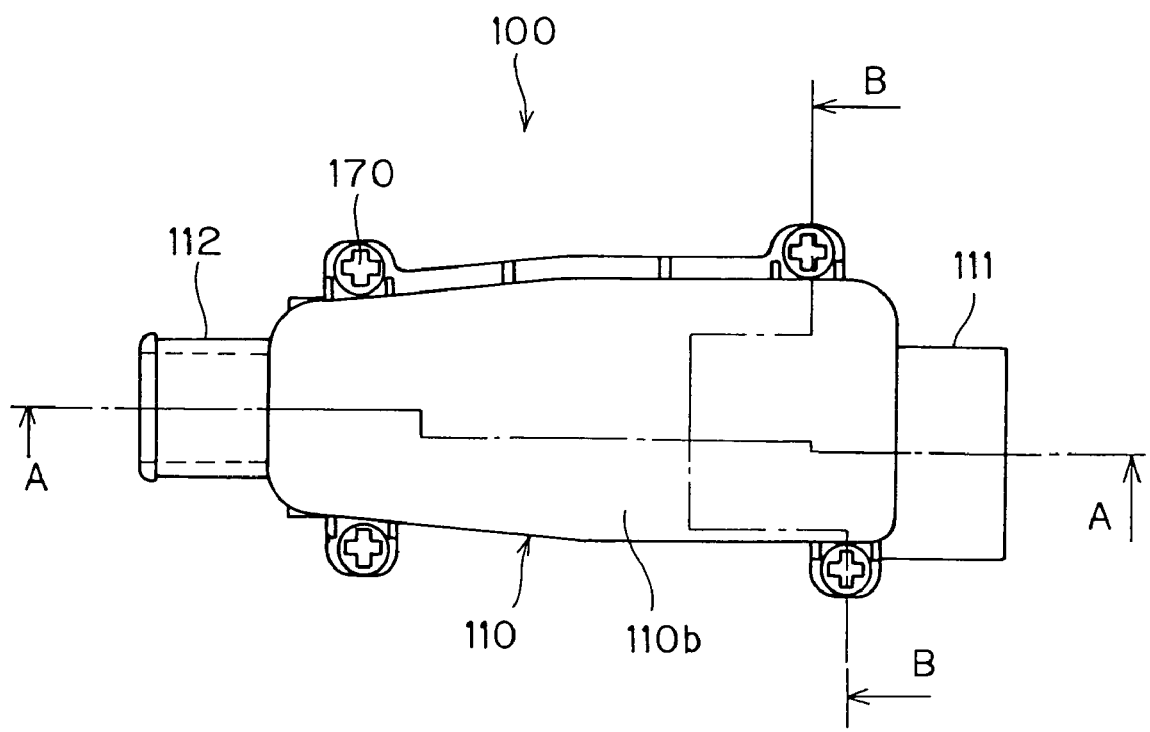
FIG. 4 is a top view of an ion elution unit.
Figure 5:
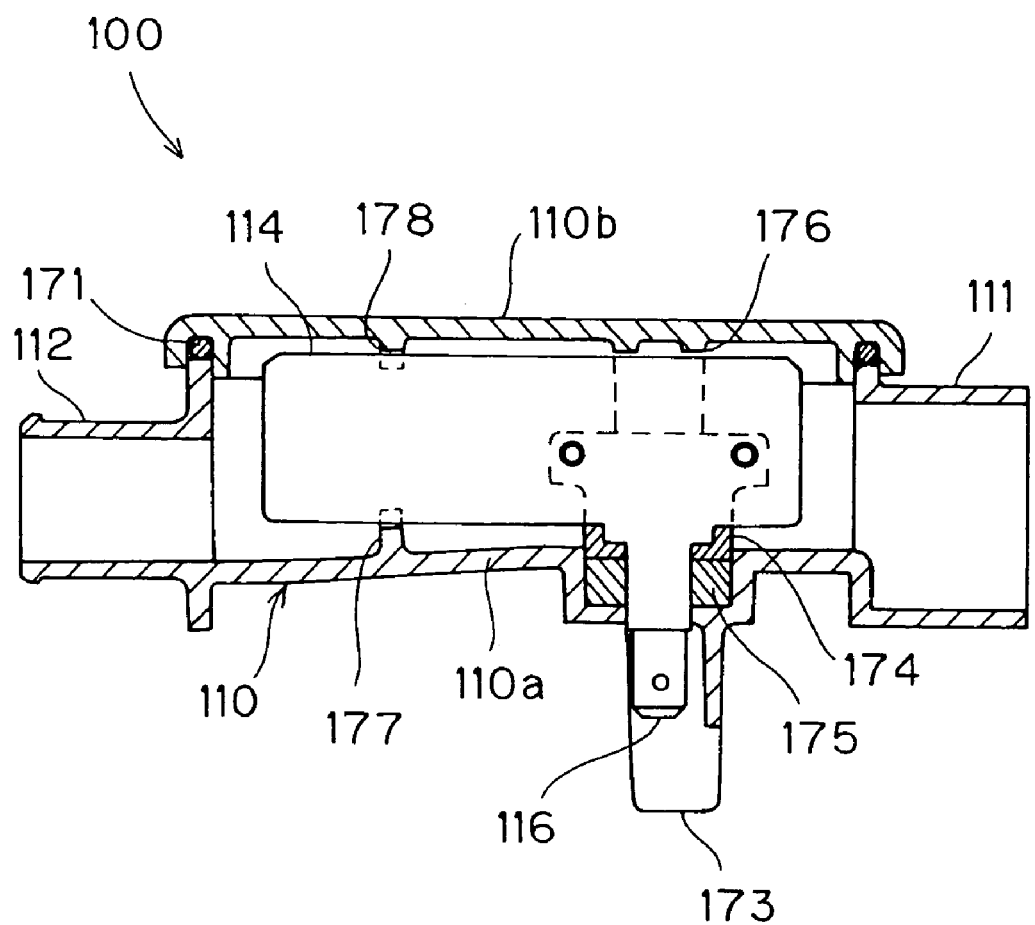
FIG. 5 is a vertical sectional view taken along line A-A shown in FIG. 4.
Figure 6:
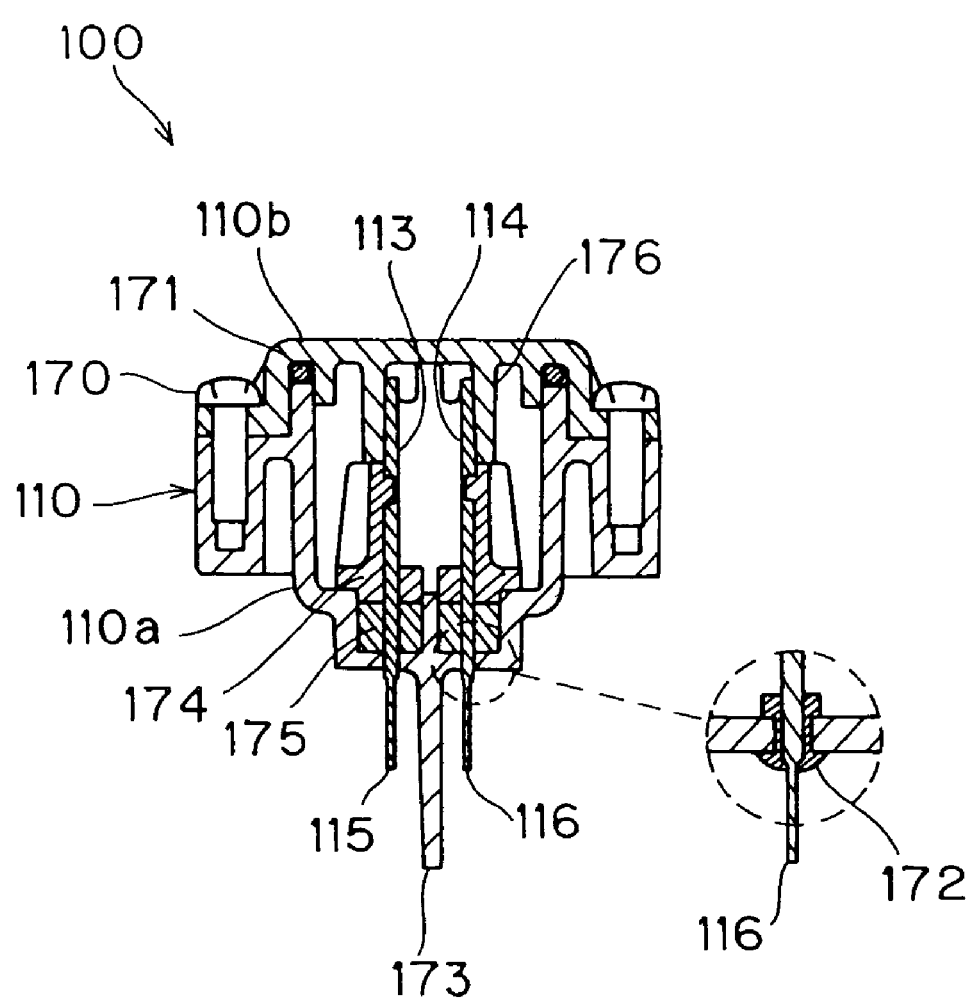
FIG. 6 is a vertical sectional view taken along line B-B shown in FIG. 4.
Figure 7:
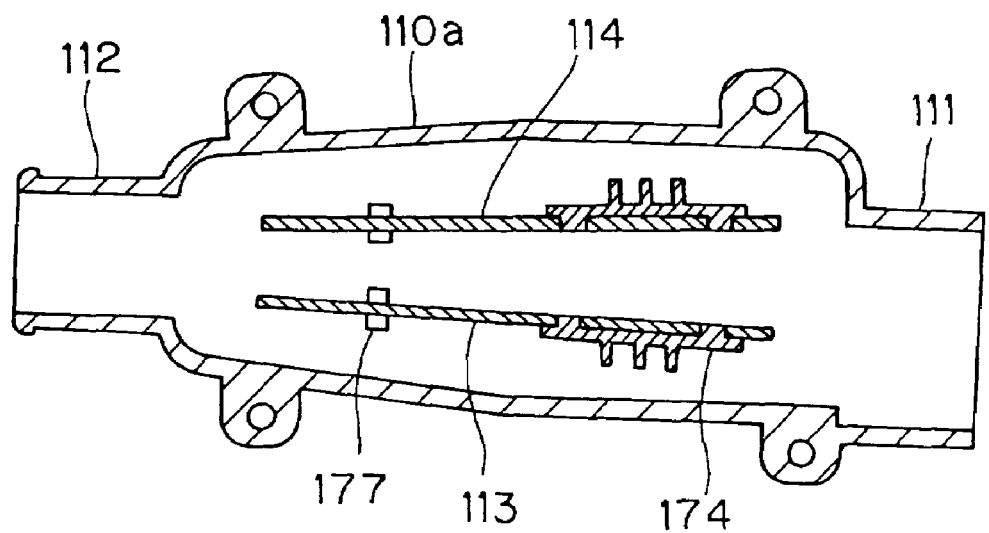
FIG. 7 is a horizontal sectional view of the ion elution unit.
Figure 8:
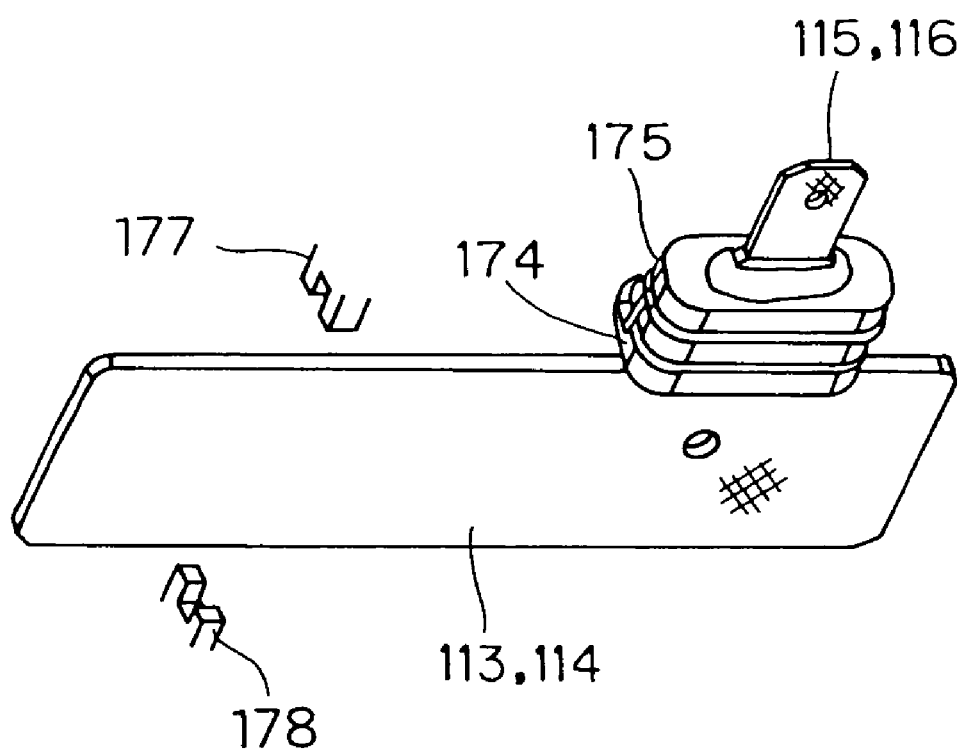
FIG. 8 is a perspective view of an electrode.

FIG. 4 through FIG. 8 shows the structure of the ion elution unit. FIG. 4 is a top view. FIG. 5 is a vertical sectional view taken along line A-A shown in FIG. 4. FIG. 6 is also a vertical sectional view taken along line B-B shown in FIG. 4. FIG. 7 is a horizontal sectional view. FIG. 8 is a perspective view of an electrode.

The ion elution unit 100 has a casing 110 formed of transparent or translucent, colorless or colored synthetic resin or opaque synthetic resin. The casing 110 is composed of a casing body 110a having an opening at the top and a lid 110b which closes the opening at the top. (See FIG. 5.) The casing 110a is shaped as long and narrow, containing a water inlet 111 at one end of the longitudinal direction and a water outlet 112 at the other end. The water inlet 111 and the water outlet 112 are pipe-shaped. Cross-sectional area of the water outlet 112 is smaller than that of the water inlet 111.

The casing 110 is arranged with its longitudinal direction being horizontal. The casing body 110a arranged horizontally in this way has a bottom that inclines gradually toward the water outlet 112. (See FIG. 5.) In other words, the water outlet 112 is located at the lowest level in an internal space of the casing 110.

The lid 110b is fixed to the casing body 110a with four screws 170. (See FIG. 4.) A seal ring 171 is inserted between the casing body 110a and the lid 110b. (See FIG. 5.)

Inside the casing 110, two plate electrodes 113 and 114 are arranged so as to be parallel to the water current flowing from the water inlet 111 toward the water outlet 112, facing each other. When a predetermined voltage is applied to the electrodes 113 and 114 with the casing 110 filled with water, metal ions of the metal of which the electrodes 113 and 114 are formed are eluted from whichever of them is at the anode side at the moment. For an example, the electrodes 113 and 114 may be so constructed that plates of silver each measuring 2 cm×5 cm and about 1 mm thick are arranged about 5 mm apart from each other.

Material of the electrodes 113 and 114 is not limited to silver. Any metal can be the material as long as it is a source for antimicrobial metal ions. Other than silver, copper, an alloy of silver and copper, zinc or the like can be selected. Silver ions eluted from a silver electrode, copper ions eluted from a copper electrode and zinc ions eluted from a zinc electrode show an excellent sterilizing effect, even on mold. From an alloy of silver and copper, silver and copper ions can be eluted simultaneously.

As for the ion elution unit 100, it is possible to select either elution or non-elution by whether a voltage is applied or not. Moreover, an amount of elution of metal ions can be controlled by controlling electric current or the time for applying a voltage. Compared with a method of eluting metal ions from zeolite or other metal ion carriers, it is convenient because it is possible to electrically select whether the metal ions are added or not and to electrically adjust the concentration of the metal ions.

The electrodes 113 and 114 are not arranged completely in parallel. In the plane view, they are arranged to be tapered, having the space between them becomes narrower from the upstream toward the downstream along the water current flowing through the inside of the casing 110, in other words, from the water inlet 111 toward the water outlet 112. (See FIG. 7.)

The plan-view shape of the casing body 110*a* is also narrowed from one end having the water inlet 111 to the other end having the water outlet 112. Namely, the cross-sectional area in the internal space of the casing 110 gradually decreases from the upstream side toward the downstream side.

The electrodes 113 and 114 have both rectangular profile, and terminals 115 and 116 are provided thereto respectively. The terminals 115 and 116 are disposed at portions inside of the edges of the electrodes 113 and 114 on the upstream side, hanging down from the lower edge of the electrodes 113 and 114 respectively.

The electrode 113 and the terminal 115 are formed integrally from the same metal, and the electrode 114 and the terminal 116 are formed integrally from the same metal. The electrodes 115 and 116 are led to the bottom of the casing body 110*a* through a hole formed in a bottom wall of the casing body 110*a*. Where the terminals 115 and 116 protrude out of the casing 110*a*, as shown in an enlarged figure in FIG. 6, a watertight seal 172 is installed. The watertight seal 172 forms a double sealing construction together with a second sleeve 175 described later so as to prevent water from leaking from this portion.

At the bottom of the casing 110*a*, an insulating wall 173, which isolates the terminals 115 and 116, is integrally formed. (See FIG. 6.) The terminals 115 and 116 are connected to a drive circuit within the controller 80 by way of a cable (not shown).

Of the terminals 115 and 116, portions remaining in the casing 110 are protected by a sleeve made of insulation material. Two types of sleeves are used. One sleeve 174 is made of synthetic resin and engaged into the roots of the terminals 115 and 116. A part of the first sleeve 174 spreads to one side of the electrodes 113 and 114, forming projections on the side of these portions and fitting these projections to the through holes made in the electrodes 113 and 114. This helps prevent the electrodes 113 and 114 from coming out of the sleeve 174. The second sleeve 175 is made of soft rubber and fills the gap between the first sleeve 174 and the bottom wall of the casing body 110*a*, thus preventing water from leaking through the gap between the second sleeve 175 and the casing body 110*a* and through the gaps between the second sleeve 175 and the electrodes 113 and 114.

As mentioned above, the terminals 115 and 116 are located on the upstream side of the electrodes 113 and 114. The upstream sides of the electrodes 113 and 114 are supported by the first sleeve 174, which is engaged to the terminals 115 and 116. On the inner surface of the lid 110*b*, a support 176 in a shape of a fork is formed so as to fit to the position of the first sleeve 174. (See FIG. 6.) This support 176 catches the upper edge of the first sleeve 174 and becomes a rigid support, together with the second sleeve 175 filling the gap between the first sleeve 174 and the casing body 110*a*. The fork-shaped support 176 catches the electrodes 113 and 114 with long and short fingers, by which the electrodes 113 and 114 can maintain an appropriate space between each other on the side of the lid 110*b*.

The downstream sides of the electrodes 113 and 114 are also supported by the support formed on the inner surface of the casing 110. A fork-shaped support 177 rises from the bottom surface of the casing body 110*a*. Also, a fork-shaped support 178 hangs down from the ceiling of the lid 110*b* to face the support 177. (See FIGS. 5 and 8.) The electrodes 113 and 114 are caught by the supports 177 and 178 at the lower and upper edges on the downstream side respectively so as not to move.

As shown in FIG. 7, the electrodes 113 and 114 are so arranged that the surfaces opposite to the surfaces that are facing each other keep a space from the inner surface of the casing 110. Moreover, as shown in FIG. 5, the electrodes 113 and 114 are so arranged as to keep a space between their upper and lower edges and the inner surface of the casing 110. (Portions which are in contact with the supports 176, 177 and 178 are exceptions.) Additionally, as shown in either of FIG. 7 and FIG. 5, a space is made between the upstream and downstream side edges of the electrodes 113 and 114 and the inner surface of the casing 110.

When it is necessary to make the width of the casing 110 much smaller, it is possible to construct the electrodes 113 and 114 in such a manner that the surfaces opposite to the surfaces that are facing each other are attached firmly to the inner wall of the casing 110.

In order to prevent foreign objects from getting contact with the electrodes 113 and 114, a strainer of a metal mesh is mounted on the upstream side of the electrodes 113 and 114. As shown in FIG. 2, a strainer 180 is placed in the connection pipe 51. The strainer 180 is for the purpose of preventing foreign objects from intruding into the water feed valve 50, and it also serves as an upstream strainer of the ion elution unit 100.

A strainer of a metal mesh 181 is mounted to the downstream side of the electrodes 113 and 114. The strainer 181 prevents broken pieces of the electrodes 113 and 114 from flowing out when they are thinned out and broken due to being used for a long time. The water outlet 112 can be selected as a site for mounting the strainer 181, for example.

The locations of the strainers 180 and 181 are not limited to the above. As long as the conditions of mounting on "the upstream side of the electrode" and on "the downstream side of the electrode" are satisfied, they can be placed at any location in the water feed passage. The strainers 180 and 181 are removable so that foreign objects they catch can be removed or substances contributing to clogging can be cleared of.

Figure 9:
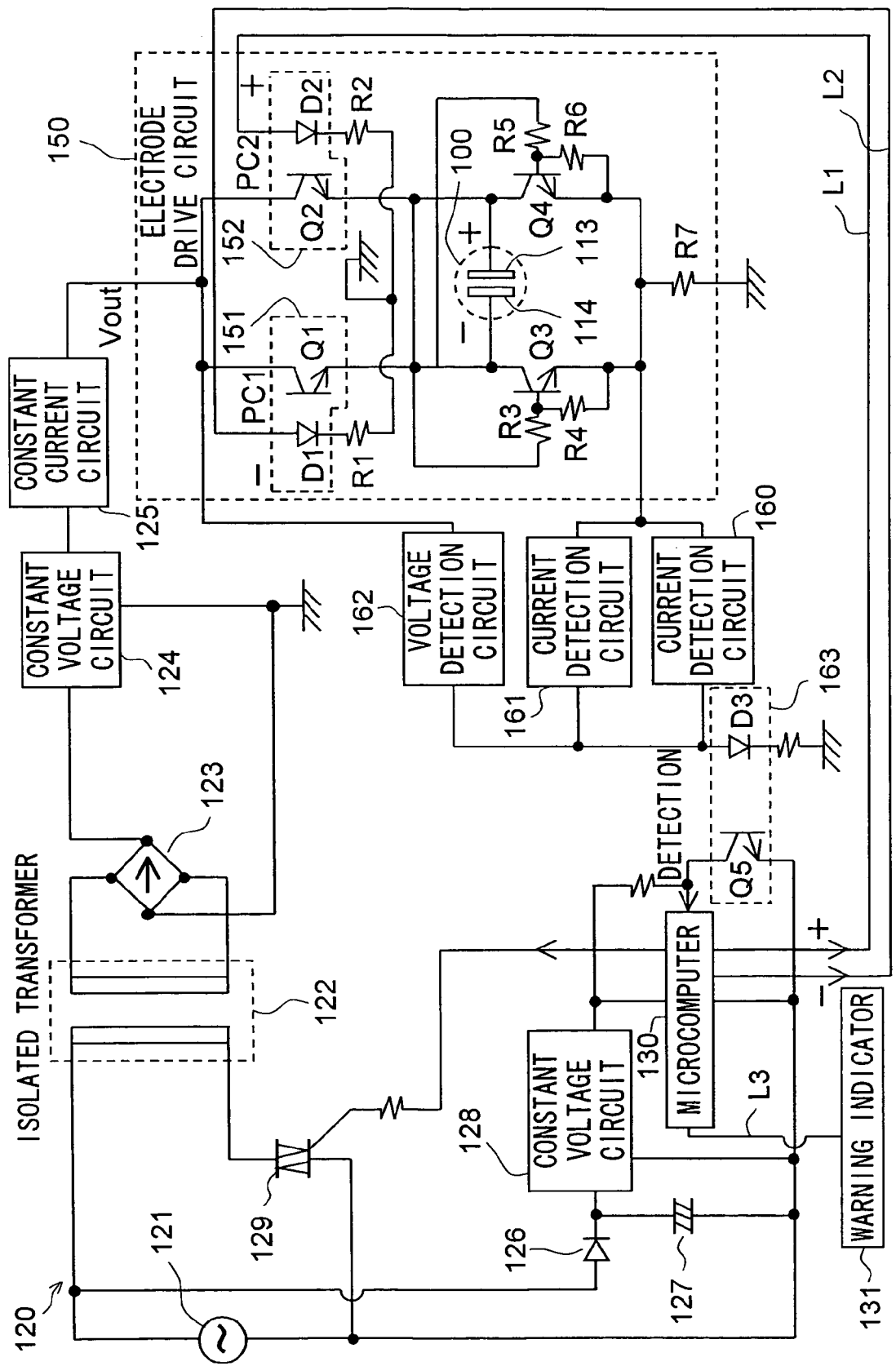
FIG. 9 is a circuit diagram of a drive circuit of the ion elution unit.

FIG. 9 shows the drive circuit 120 for the ion elution unit 100. A transformer 122 is connected to commercially distributed electric power 121 so as to step down 100 V to a predetermined voltage. The output voltage of the transformer 122 is rectified by a full-wave rectifier circuit 123, and is then formed into a constant voltage by a constant voltage circuit 124. To the constant voltage circuit 124 is connected a constant current circuit 125. The constant current circuit 125 operates in such a way as to supply a constant current to the electrode drive circuit 150 described later without being influenced by variation in the resistance through the electrode drive circuit 150.

To the commercially distributed electric power 121 is also connected, in parallel with the transformer 122, a rectifying diode 126. The output voltage of the rectifying diode 126 is smoothed by a capacitor 127, is then formed into a constant voltage by a constant voltage circuit 128, and is then supplied to a microcomputer 130. The microcomputer 130 controls the starting of a triac 129 connected between one end of the primary coil of the transformer 122 and the commercially distributed electric power 121.

The electrode drive circuit 150 is composed of NPN-type transistors Q1 to Q4, diodes D1 and D2, and resistors R1 to R7. These are interconnected as shown in the figure. The transistor Q1 and the diode D1 form a photocoupler 151, and the transistor Q2 and the diode D2 form a photocoupler 152. The diodes D1 and D2 are photodiodes, and the transistors Q1 and Q2 are phototransistors.

The microcomputer 130 feeds a high-level voltage to a line L1 and a low-level voltage (or zero voltage, namely, "off") to a line L2. Then, the diode D2 turns on, and this causes the transistor Q2 to turn on. When the transistor Q2 turns on, a current flows through the resistors R3, R4, and R7, and this causes a bias to be applied to the base of the transistor Q3. Thus, the transistor Q3 turns on.

On the other hand, the diode D1 is off, and thus the transistors Q1 is off, and accordingly the transistor Q4 is off. In this state, a current flows from the anode-side electrode 113 to the cathode-side electrode 114. As a result, in the ion elution unit 100, there are produced metal ions as positively-charged ions together with negatively-charged ions.

When an electric current is passed through the ion elution unit 100 in one direction for a long time, the electrode 113, which is at the anode side in FIG. 9, wears off, while the electrode 114, which is at the cathode side, collects impurities in water in the form of scales deposited on it. This degrades the performance of the ion elution unit 100. In order to avoid this, the electrode drive circuit 150 can be operated in a compulsory electrode-cleaning mode.

In the compulsory electrode-cleaning mode, the microcomputer 130 switches modes of control so as to invert the voltage applied between the lines L1 and L2 and thereby reverse the current that flows between the electrodes 113 and 114. In this mode, the transistors Q1 and Q4 are on, and the transistors Q2 and Q3 are off. The microcomputer 130 has a counter capability, and switches modes of control as described above every time a predetermined count is reached.

When the resistance through the electrode drive circuit 150, in particular, the resistance of the electrodes 113 and 114, varies and as a result, for example, the current that flows between the electrodes decreases, the constant current circuit 125 raises its output voltage to compensate for the decrease. However, as the total time of use increases, the ion elution unit 100 eventually reaches the end of its service life. When this happens, even if the mode of control is switched to the forcible electrode cleaning mode, or if the output voltage of the constant current circuit 125 is raised, it is no longer possible to compensate for the decrease in the current.

In order to cope with this, in the circuit under discussion, the current that flows between the electrodes 113 and 114 of the ion elution unit 100 is monitored on the basis of the voltage that it produces across the resistor R7. When the current becomes equal to a predetermined minimum current, a current detection circuit 160 detects it. The fact that the minimum current has been detected is transmitted from a photodiode D3, which is a part of a photocoupler 163, through a phototransistor Q5 to the microcomputer 130. The microcomputer 130 then drives, by way of a line L3, a warning indicator 131 to make it indicate a predetermined warning. The warning indicator 131 is provided in the operation/display panel 81 or in the controller 80.

Moreover, in order to cope with a fault such as short-circuiting within the electrode drive circuit 150, there is provided a current detection circuit 161 that detects the current being larger than a predetermined maximum current. On the basis of the output of this current detection circuit 161, the microcomputer 130 drives the warning indicator 131. Furthermore, when the output voltage of the constant current circuit 125 becomes lower than a previously set minimum voltage, a voltage detection circuit 162 detects it, and the microcomputer 130 likewise drives the warning indicator 131.

The metal ions generated by the ion elution unit 100 are poured into the washing tub in the following manner.

Figure 14:
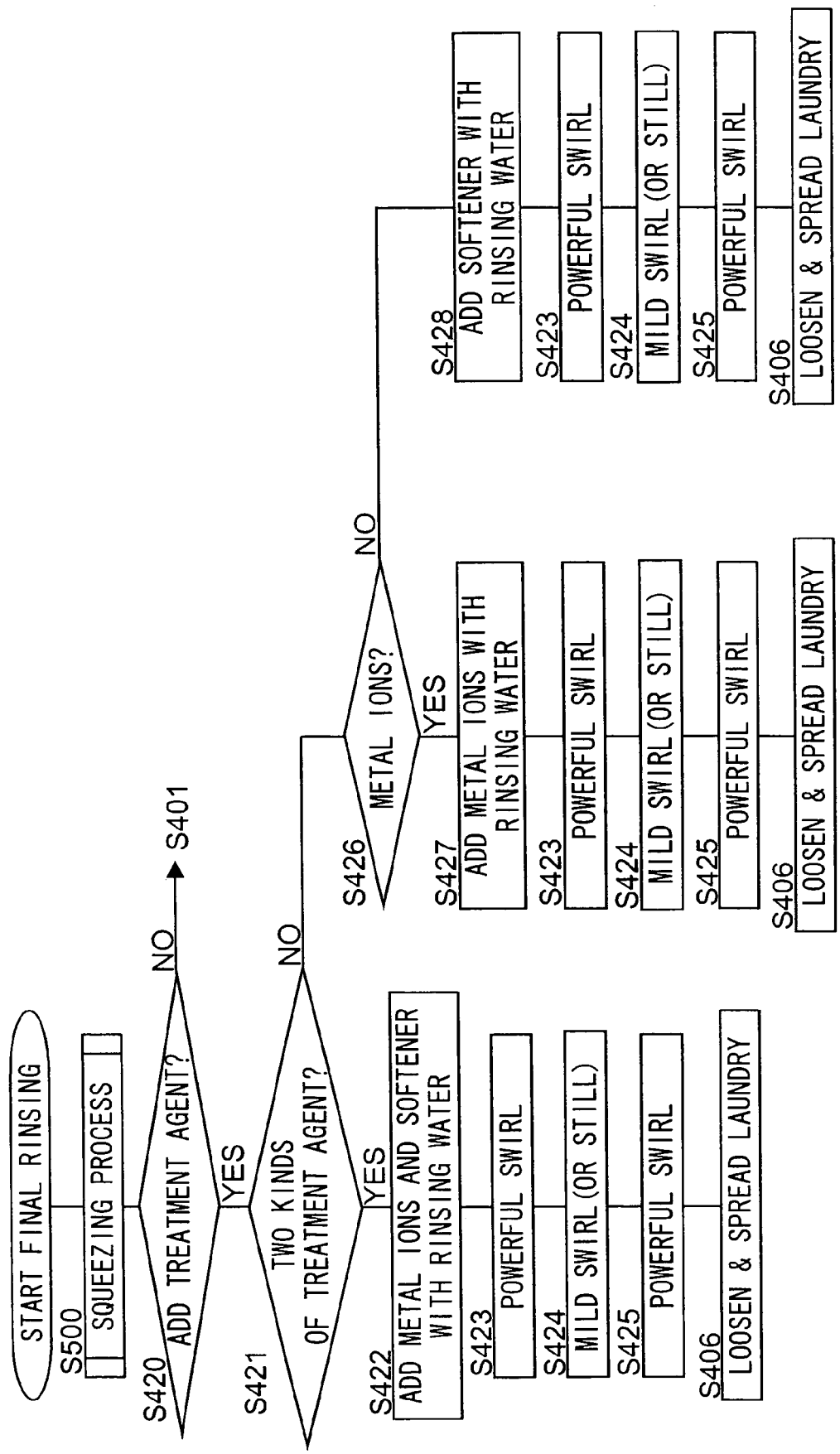
FIG. 14 is a flow chart of a final rinsing process.

Metal ions and a softening agent to be used as a treatment agent are added in the final rinsing process. FIG. 14 is a flow chart showing the sequence of the final rinsing. In the final rinsing process, after the squeezing process of step S500, the flow proceeds to step S420. In step 420, whether addition of the treatment material is selected or not is checked. When "addition of a treatment agent" is selected through a selection operation performed by way of the operation/display panel 81, the flow proceeds to step S421. If not, the flow proceeds to step S401 in FIG. 12, and the final rinsing is executed in the same manner as in the previous rinsing processes.

In step S421, whether the treatment materials to be added are two types, that is metal ions and a softening agent, or not, is checked. When "metal ions and a softening agent" is selected through a selection operation performed by way of the operation/display panel 81, the flow proceeds to step S422; if not, the flow proceeds to step S426.

In step S422, both of the main water feed valve 50a and the sub water feed valve 50b are opened, and water flows into both of the main water feed passage 52a and the sub water feed passage 52b.

Step S422 is a process for elution of metal ions. A predetermined amount of water, which is set to be more than the volume of water set for the sub water feed valve 50b, is flowing, filling the internal space of the ion elution unit 100. Simultaneously, the drive circuit 120 applies a voltage between the electrodes 113 and 114, so that ions of the metal of which they are formed are eluted into the water. When the metal forming the electrodes 113 and 114 is silver, reaction of $Ag \rightarrow Ag^+ + e^-$ occurs on the anode side and silver ions $Ag^+$ are eluted into the water. The electric current flowing between the electrodes 113 and 114 is direct current. Water to which the metal ions are added flows into the detergent chamber 54 and then is poured into the washing tub 30 from the water outlet 54a by way of the water outlet 56.

From the sub water feed valve 50b, smaller amount of water than that from the main water feed valve 50a flows out and is poured into the treatment agent chamber 55 by way of the sub water feed passage 52b. If a treatment agent (softening agent) has been supplied into the treatment agent chamber 55, the treatment agent (softening agent) is fed into the washing tub 30 through the siphon 57 together with water. This addition is performed simultaneously when the metal ions are added. The effect of a siphon does not occur until the water level inside the treatment agent chamber 55 reaches a predetermined level. This permits the liquid treatment agent (softening agent) to be held in the treatment agent chamber 55 until the time comes when water is poured into the treatment agent chamber 55.

When a predetermined amount of water (so much as or more than the amount to cause the effect of a siphon to occur in the siphon 57) is poured into the treatment agent chamber 55, the sub water feed valve 50b is closed. This step of feeding water, namely, adding a treatment agent, is performed automatically, irrespective of whether or not a treatment agent (softening agent) has been put into the treatment agent chamber 55 so long as "addition of a treatment agent" is selected.

When a predetermined amount of water containing metal ions has been poured into the washing tub 30, and the concentration of metal ions in the rinsing water is expected to be a predetermined level when water containing no metal ions is fed to the set water level, the application of a voltage between the electrodes 113 and 114 is stopped. After the ion elution unit 100 stops generation of metal ions, the main water feed valve 50a continues supplying water and stops water supply when the water level in the washing tub 30 reaches the set level.

As described above, in step S422, metal ions and a treatment agent (softening agent) are added simultaneously. However, this does not necessarily mean that the time during which a treatment agent (softening agent) is poured into the washing tub through an effect of a siphon completely overlaps the time while the ion elution unit 100 is generating metal ions. Either of the above time may be shifted to be earlier or later than the other. After the ion elution unit 100 stops generation of the metal ions and while water containing no metal ions is additionally fed, the treatment agent (softening agent) may be added. The point is that it is sufficient so long as the addition of metal ions and the addition of a treatment agent (softening agent) are executed respectively in one sequence.

As described before, the terminal 115 is formed to the electrode 113 integrally and the terminal 116 is formed to the electrode 114 integrally, from the same metal. Therefore, different from a case where different metals are connected, potential difference does not occur between the electrodes and terminals, thus preventing corrosion from occurring. Additionally, being formed integrally simplifies the manufacturing process.

The space between the electrodes 113 and 114 is set to be in a tapered manner, becoming narrower from the upstream side toward the downstream side. This makes the electrodes 113 and 114 be in line with the flow, and the electrodes 113 and 114 are more likely not generating vibration, thereby even when they wear off and are thinned, they hardly are chipped off. Moreover, there is no concern for excessive deformation of electrodes that might result in a short circuit.

The electrodes 113 and 114 are supported in a manner that a space is made between them and the inner surface of the casing 110. This helps prevent a metal layer from growing from the electrodes 113 and 114 to the inner surface of the casing 110 and causing a short circuit between electrodes.

Although the terminals 115 and 116 are formed integrally to the electrodes 113 and 114 respectively, the electrodes 113 and 114 are eventually depleted as a result of use. However, the terminals 115 and 116 should be kept from depletion. In an embodiment of the present, the portions of the terminals 115 and 116 located inside the casing 110 are protected by the sleeves 174 and 175 made of insulating material, and are guarded from depletion caused by electric conduction. This helps prevent such situation as the terminals 115 and 116 are broken in midway of their use.

In the electrodes 113 and 114, the portions where the terminals 115 and 116 are formed are rather deep inside from the edge on the upstream side. The electrodes 113 and 114 wear off, starting at a portion where the space between them has become narrow. In general, depletion occurs at the edge portion. Although the terminals 115 and 116 are located in the upstream side of the electrodes 113 and 114, they are not completely at the edges, but at rather deep inside portions from the edges. Therefore, it is not necessary to be worried about a situation that the depletion starting at the edge of an electrode reaches the terminal to cause a breakage of the terminal at its root.

The electrodes 113 and 114 are supported by the first sleeve 174 and the support 176 on their upstream sides. On the other hand, the downstream sides of the electrodes 113 and 114 are supported by the supports 177 and 178. Since they are supported rigidly on both upstream side and downstream sides in this way, the electrodes 113 and 114 do not vibrate although they are in the water current. As a result, the electrodes 113 and 114 do not get broken due to vibration.

The terminals 115 and 116 go through the bottom wall of the casing body 110a to be protruded downward. Therefore, although the external surface of the casing 110 is subjected to dew concentration because steam gets contact with the casing 110a (When warm water in a bath tub is used for washing, stream is easy to intrude into the interior of the washer 1.) or because the casing 110 is cooled by feeding of water, the water from dew condensation flows down the cables connected to the terminals 115 and 116 and do not stay on the border between the terminals 115 and 116 and the casing 110. Therefore, no situation is developed in which a short circuit occurs between the terminals 115 and 116 due to the water caused by dew condensation. The casing body 110a is arranged with the longitudinal direction on the horizontal line, it is easy to make it constructed in a manner that the terminals 115 and 116 formed on the sides of the electrodes 113 and 114 protrude downward through the bottom wall of the casing body 110a.

The cross-sectional area of the water outlet 112 of the ion elution unit 100 is smaller than that of the water inlet 111 and has larger resistance to the flow than the water inlet 111. This makes water entering the casing 110 through the water inlet 111 fill the interior of the casing 110 without causing stagnant air and soak the electrodes 113 and 114 completely. Therefore, such situation as the electrodes 113 and 114 have portions that are unrelated to the generation of metal ions but remain un-melted does not occur.

Not only the cross-sectional area of the water outlet 112 is smaller than that of the water inlet 111 but also the cross-sectional area of the inner space of the casing 110 is gradually decreasing from the upstream side toward the downstream side. This makes generation of turbulence or air bubble inside the casing 110 be reduced, thereby making water flow smoothly. Also, this prevents the electrodes partially not melted by the existence of air bubble. The metal ions come off the electrodes 113 and 114 quickly and do not go back to the electrodes 113 and 114, thus increasing the efficiency of ion elution.

The ion elution unit 100 is arranged in the main water feed passage 52a for a large volume of flow where a large amount of water flows. This permits the metal ions to be carried out of the casing 110 quickly and prevents them from going back to the electrodes 113 and 114, thus increasing the efficiency of ion elution.

The water outlet 112 is placed at the lowest level in the inner space of the casing 110. Therefore, when feeding of water to the ion elution unit 100 is stopped, all the water in the ion elution unit 100 flows out through the water outlet 112. In consequence, no such a case occurs as water remaining in the casing 110 is frozen at a cold time and the ion elution unit 100 fails or breaks.

A strainer 180 is placed on the upstream side of the electrodes 113 and 114. This makes it possible that although solid foreign object exists in water fed to the ion elution unit 100, the foreign object is caught by the strainer 180, which prevents it from reaching the electrodes 113 and 114. Consequently, a foreign object does not damage the electrodes 113 and 114, nor cause a short circuit between the electrodes to cause an excessive electric current or to lead to metal ion generation shortage.

A strainer 181 is placed on the downstream sides of the electrodes 113 and 114. If the electrodes 113 and 114 are depleted and become fragile due to a long-time use and get broken into pieces and the broken pieces flow, the strainer 181 catches these broken pieces so as to prevent them from flowing toward the downstream from that point. As a result, broken pieces of the electrodes 113 and 114 do not damage an object on the downstream side.

As the embodiment of the present invention, when a washer 1 is furnished with the ion elution unit 100, foreign objects or broken pieces of electrodes may be attached to laundry if there are no strainers 180 and 181. There is a possibility that foreign objects or broken pieces of electrodes may spoil or damage laundry, and if laundry where foreign objects or broken pieces of electrodes remain attached is subjected to squeezing and drying, a person who wears the laundry later may touch them and feel uncomfortable or in the worst case, he may get hurt. However, installation of the strainers 180 and 181 can avoid such a situation.

Both of the strainers 180 and 181 do not have to be placed. When it is determined that no installation of a strainer causes a problem, one or both of them can be abolished.

Back in FIG. 14, in step S423, the rinsing water to which the metal ions and the treatment agent (softening agent) are added is agitated by a powerful water flow (powerful swirl) and thus promotes contact of the laundry with the metal ions and attachment of the treatment agent (softening agent) to the laundry.

By thoroughly agitating by the powerful swirl, the metal ions and the treatment agent (softening agent) can be melted uniformly in water and spread to every corner of the laundry. After agitation by the powerful swirl for a predetermined time, the flow proceeds to step S424.

In step S424, the situation is completely changed. Agitation is executed by weak water flow (mild swirl). Its aimed purpose is to make the metal ions attached to the surface of laundry to exert their effect. As long as there is a water flow although it is mild, there is no possibility of users' misunderstanding that the operation of the washer 1 has been over. Therefore, agitation is executed mildly. However, if there is a method to make users realize that the rinsing process is still in progress, for example, by displaying an indication on the operation/display panel 81 to evocate the users' attention, it is permissible to stop agitation and place the water at a standstill.

After a period of mild swirl, which is set to be sufficient for laundry to absorb the metal ions, the flow proceeds to step S425. Here, agitation for ensuring is executed again with using a powerful water flow (powerful swirl). This helps distribute the metal ions to the portions of laundry where the metal ions have not been spread and make them attached firmly.

After step S425, the flow proceeds to step S406. In step S406, the pulsator 33 rotates repeatedly in the forward and then reverse directions at short time intervals. This permits the laundry to loosen, and thereby permits it to spread evenly in the washing tub 30. This is done in preparation for squeezing rotation.

An example is given to show the distribution of time for each step: four minutes for step S423 (powerful swirl); four minutes and fifteen seconds for step S424 (mild swirl), five seconds for step S425 (powerful swirl) and one minute and forty seconds for step S406 (even spreading of laundry). Total time from step S423 to step 406 is ten minutes.

Basically, it is preferable to add metal ions and a treatment agent (softening agent) separately. This is because when the metal ions come to contact with a component of the softening agent, they change into chemical compounds, thus losing the antimicrobial effect of the metal ions. However, quite an amount of metal ions remain in the rinsing water till the last of rinsing process. Also, the loss of the effect of the metal ions can be compensated to a certain degree by setting the concentration of the metal ions appropriately. Therefore, by adding the metal ions and the treating agent (softening agent) simultaneously, the rinsing time is shortened compared with the case that the metal ions and the treating agent (softening agent) are separately added for separate processes of rinsing, leading to the promotion of household efficiency, although the efficacy of addition of resistance to microbes is reduced slightly.

Although it is inevitable that the metal ions and the treatment agent (softening agent) meet in the washing tub 30, it is desirable to prevent them from getting in contact with each other until they enter the washing tub 30. In the embodiment of the present invention, metal ions are added to the washing tub 30 from the main water feed passage 52a through the detergent chamber 54. The treatment agent (softening agent) is added to the washing tub 30 from the treatment agent chamber 55. Since the passage for adding the metal ions to the rinsing water is thus separated from the passage for adding the treatment agent to the rinsing water, the metal ions and the treatment agent (softening agent) do not get in contact with each other until they meet in the washing tub 30. Consequently, the metal ions do not change into chemical components by getting contact with the treatment agent (softening agent) of high concentration and lose their antimicrobial effect.

In the description, the final rinsing is assumed to be performed with rinsing water stored in the washing tub 30. However, it is also possible to perform the final rinsing by water being poured, namely, in the manner of "rinsing with pouring water." In this case, the poured water contains metal ions.

If the laundry does not spread evenly in step S406 and water is poured again for "rinsing for correcting uneven spreading of laundry," metal ions are added to the water.

Either of the addition of the metal ions, the first treatment substance, and the addition of a treatment agent (softening agent), the second treatment substance, is optional. It is possible not to carry out either of the additions or both of the additions. When both additions are not to be executed, the flow proceeds from step S420 to step S401, and this has already been described. From now on, addition of either of the two types of treatment substances will be described.

In step S421, when the treatment substance to be added is not both of the two types, the metal ions and the softening agent, it means that only one of them is selected for addition. In this case, the flow proceeds to step S426.

In step S426, whether the treatment substance to be added is metal ion or not is checked. When it is determined to be metal ions, the flow proceeds to step S427; if not, the flow proceeds to step S428.

In step S427, the main water feed valve 50a is opened and water flows into the main water feed passage 52a. The sub water feed valve 50b is not opened. When water flows through the ion elution unit 100, the drive circuit 120 applies a voltage between the electrodes 113 and 114, which elutes ions of the metal composing the electrodes into the water. When it is determined that a predetermined amount of water containing metal ions has been poured into the washing tub 30, and a predetermined concentration of metal ions in the rinsing water can be obtained by adding water containing no metal to a set water level, application of a voltage to the electrodes 113 and 114 is stopped. After the ion elution unit 100 stops generation of the metal ions, the main water feed valve 50a continues to feed water until the water level inside the washing tub 30 reaches the set level.

After step S427, the flow proceeds to step S423. After that, in the same manner as when the metal ions and the treatment agent (softening agent) are added simultaneously, the flow proceeds from S423 (powerful swirl) to step S424 (mild swirl) and then to step S425 (powerful swirl) and to step S406 (even spreading of laundry.) The mild swirl period can be replaced with a still period.

If, in step S426, the treatment substance to be added is not metal ions, then the treatment substance is treatment agent (softening agent). In this case, the flow proceeds to step 428.

In step 428, both the main water feed valve 50a and the sub water feed valve 50b are opened and water is fed to both of the main water feed passage 52a and the sub water feed passage 52b. However, the ion elution unit 100 is not operated and metal ions are not generated. After sufficient water for causing an effect of siphon is supplied to the treatment agent chamber 55 and the treatment agent (softening agent) is put into the washing tub 30 by way of the siphon 57, the sub water feed valve 50b is closed.

After the sub water feed valve 50b is closed, the main water feed valve 50a continues to feed water and stops feeding when the water level inside the washing tub 30 reaches a set level.

After step S428, the flow proceeds to step S423. After that, in the same manner as when metal ions and treatment agent (softening agent) are added simultaneously, the flow proceeds from S423 (powerful whirl), to step S424 (mild swirl) and then to step S425 (powerful swirl) and to step S406 (even spreading of the laundry). The mild swirl period can be replaced with a still period.

In this way, even when only one type of treatment substances is added, each of the steps from the powerful whirl to the mild swirl and then to the powerful whirl is to be taken to ensure that the treatment substance is attached to the laundry. However, since it is not necessary to equal the step-time distribution for metal ions and that for treatment agent (softening agent), the step-time distribution is adjusted to fit the type of treatment substance.

In case of a treatment agent (softening agent), it does not take a long time to attach to the laundry, unlike the case of the metal ions. Therefore, it is possible that after step S428, only step S423 (powerful whirl) and step S406 (even spreading of laundry) are taken and step S423 (powerful whirl) can be finished within a short time such as two minutes, for example.

In order to operate the ion elution unit 100, constant current circuit 125 of the drive circuit 120 controls the voltage, so that the current flowing between the electrodes 113 and 114 is constant. By this, the amount of eluted metal ions per unit time becomes constant. When the amount of eluted metal ions per unit time is constant, it is possible to control the concentration of metal ions in the washing tub 30 by controlling the volume of water flowing through the ion elution unit 100 and the time of metal ion elution, thereby the expected concentration of metal ions is easily achieved.

The current flowing between the electrodes 113 and 114 is direct current. If the current is alternating current, the following phenomenon occurs. Namely, when the metal ions are silver ions, for example, the silver ions that have once been eluted go back to the electrodes by reverse reaction, i.e. $Ag^+ + e^- \rightarrow Ag$, when the polarity of the electrodes is reversed. However, in case of direct current, such phenomenon does not occur.

On either one of the electrodes 113 and 114, if it acts as a cathode, scale is deposited. When direct current continues to flow without reversing the polarity and, as a result, the amount of scale deposit become larger, the current is subjected to be restricted, and the metal ion elution does not proceed at the predetermined rate. Moreover, a phenomenon of "one-sided depletion," in which only one electrode being used as an anode is consumed at a rate faster than the other. Therefore, the polarity of the electrodes 113 and 114 is reversed cyclically.

Being used for metal ion elution, the electrodes 113 and 114 are gradually depleted, resulting in drop in metal ion elution rate. When they are used for a long time, the metal ion elution rate becomes unstable and the predetermined metal ion elution rate is not obtained. Therefore, the ion elution unit 100 is made replaceable, and when the duration of electrodes 113 and 114 expires, it can be replaced with a new unit. Moreover, users are notified, through the operation/display panel 81, the fact that the duration of electrodes 113 and 114 almost expires and therefore appropriate countermeasures, for example, replacement of the ion elution unit 100, should be adapted.

It is to be understood that the present invention may be carried out in any other manner than specifically described above as an embodiment, and many modifications and variations are possible within the scope of the invention.

INDUSTRIAL APPLICABILITY

The present invention finds wide application in situations wherein exploitation of the antimicrobial effect of metal ions is attempted. An ion elution unit according to the present invention can be effectively combined not only with a washer but also with a dish-washer, a humidifier, or any other type of appliance where growth of bacteria and mold needs to be suppressed. As for washers, to all types of washer than those of automatic type like the one, such as those having horizontal drums (e.g. tumbler type), those having slanted drums, those which function also as dryers, and those with two separated tubs, the present invention can be applied.

The invention claimed is:

1. An ion elution unit generating metal ions by applying a voltage between electrodes,
    wherein an interval between the electrodes becomes narrower from an upstream side to a downstream side with respect to a water current flowing through an inside of a casing of the ion elution unit.

2. An ion elution unit generating metal ions by applying a voltage between electrodes, comprising:
    a casing having a water inlet and a water outlet allowing a water current to flow through the casing, constantly in a horizontal direction, from the inlet to the outlet; and
    terminals that are so laid as to extend from the electrodes and out of the casing, the terminals being disposed on an upstream side with respect to the water current flowing through an inside of the casing,
    wherein the electrodes extend along a direction of water flowing out of the inlet.

3. An ion elution unit generating metal ions by applying a voltage between electrodes, comprising:
- a casing having a water inlet and a water outlet allowing a water current to flow through the casing, constantly in a horizontal direction, from the inlet to the outlet; and
- terminals that are so laid as to extend from the electrodes and out of the casing, the terminals being disposed on an upstream side with respect to the water current flowing through an inside of the casing, and a supporting portion for supporting downstream-side parts of the electrodes being formed on an inner surface of the casing,
- wherein the electrodes extend along a direction of water flowing out of the inlet.

4. An ion elution unit generating metal ions by applying a voltage between electrodes, comprising:
- a casing having a casing body and a lid attached to the casing body, the lid having a support that extends into a chamber defined inside the casing;
- terminals laid from the electrodes being so formed as to penetrate a bottom wall of the casing body and protrude downward; and
- a sleeve that engages with a surface of an electrode and makes contact with the support when the lid is attached to the casing body.

5. An ion elution unit generating metal ions by applying a voltage between electrodes, comprising:
- a casing body;
- a water inflow port and a water outflow port extending from the casing body, a cross-sectional flow area of the water inflow port and a cross-sectional flow area of the water outflow port being smaller than a cross-sectional flow area of the casing body,
- wherein the water outflow port is given a smaller cross-sectional flow area than the water inflow port.

6. An ion elution unit generating metal ions by applying a voltage between electrodes, comprising:
- a casing body; and
- a water inflow port and a water outflow port extending from the casing body,
- wherein a cross-sectional flow area of the casing body gradually decreases from an upstream side to a downstream side.

7. An ion elution unit generating metal ions by applying a voltage between electrodes, comprising:
- a casing having a water inflow port and a water outflow port, such that a water current flows through the casing constantly in a horizontal direction from the inlet port to the outlet port,
- wherein a bottom surface of the casing and an inner surface of a lowest portion of the water outflow port share a common plane.

8. The ion elution unit according to any one of claims 1 to 7,
- wherein, of the electrodes, a positive electrode is made of one of silver, copper, zinc, or silver-copper alloy.

9. The ion elution unit according any one of claims 1 to 7,
- wherein, of the electrodes, both positive and negative electrodes are made of one of silver, copper, zinc, or silver-copper alloy.

10. An appliance, comprising:
the ion elution unit according to claim 9,
wherein polarities of the electrodes are reversed periodically.

11. An appliance, comprising:
the ion elution unit according to claim 9,
wherein the metal ions generated by the ion elution unit are used by being added to water.

12. An appliance comprising:
the ion elution unit according to claim 10,
wherein the metal ions generated by the ion elution unit are used by being added to water.

13. The appliance according to claim 11,
wherein the appliance is a washing machine.

14. The appliance according to claim 12,
wherein the appliance is a washing machine.

* * * * *